(12) United States Patent
Priyadarshi et al.

(10) Patent No.: US 11,392,410 B2
(45) Date of Patent: Jul. 19, 2022

(54) OPERAND POOL INSTRUCTION RESERVATION CLUSTERING IN A SCHEDULER CIRCUIT IN A PROCESSOR

(71) Applicant: Microsoft Technology Licensing, LLC, Redmond, WA (US)

(72) Inventors: Shivam Priyadarshi, Morrisville, NC (US); Yusuf Cagatay Tekmen, Raleigh, NC (US); Rodney Wayne Smith, Raleigh, NC (US); Vignyan Reddy Kothinti Naresh, Morrisville, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 112 days.

(21) Appl. No.: 16/842,898

(22) Filed: Apr. 8, 2020

(65) Prior Publication Data

US 2021/0318905 A1    Oct. 14, 2021

(51) Int. Cl.
*G06F 9/48* (2006.01)
*G06F 9/30* (2018.01)
*G06F 9/38* (2018.01)
*G06F 9/50* (2006.01)

(52) U.S. Cl.
CPC ........ *G06F 9/4881* (2013.01); *G06F 9/30101* (2013.01); *G06F 9/30145* (2013.01);
(Continued)

(58) Field of Classification Search
CPC .. G06F 9/4881; G06F 9/30101; G06F 9/3836; G06F 9/5011; G06F 9/3838;
(Continued)

(56) References Cited

U.S. PATENT DOCUMENTS 5,881,262 A * 3/1999 Abramson ............ G06F 9/3834
712/216
2003/0191925 A1 10/2003 Ernst et al.
(Continued)

OTHER PUBLICATIONS

Stark et al. "On Pipelining Dynamic Instruction Scheduling Logic" Intel Corp. (Year: 2000).*
(Continued)

*Primary Examiner* — Michael J Metzger
(74) *Attorney, Agent, or Firm* — Withrow & Terranova, PLLC

(57) ABSTRACT

Operand pool instruction reservation clustering in a scheduler circuit in a processor is disclosed. The scheduler circuit includes a plurality of operand pool reservation circuits each having an assigned number of source operands for an instruction stored that must be ready before the instruction is issued. Instructions having the same number of source operands that are not yet ready for its issuance can be stored in an operand pool reservation circuit having the same assigned number of source operands. In this manner, the number of reservation entries and associated comparator circuits in the clustered scheduler circuit is distributed among the plurality of operand pool reservation circuits to avoid or reduce an increase in the number of scheduling path connections and complexity in each reservation circuit. This can avoid or reduce an increase in scheduling latency for a given number of reservation entries in the clustered scheduler circuit.

24 Claims, 7 Drawing Sheets

(52) U.S. Cl.
CPC .......... *G06F 9/3836* (2013.01); *G06F 9/5011* (2013.01); *G06F 2209/5011* (2013.01); *G06F 2209/5014* (2013.01)

(58) Field of Classification Search
CPC .. G06F 9/3855; G06F 9/5038; G06F 9/30007; G06F 9/30043; G06F 9/3824; G06F 9/3826; G06F 9/3828; G06F 9/383; G06F 9/3832; G06F 9/4843; G06F 2209/5011; G06F 2209/5014; G06F 9/3881
USPC .......... 712/214, 215, 216–219; 718/102–108
See application file for complete search history.

(56) References Cited

U.S. PATENT DOCUMENTS

| | | | |
|---|---|---|---|
| 2009/0037697 A1* | 2/2009 | Ramani | G06F 9/3834 712/214 |
| 2009/0037698 A1 | 2/2009 | Nguyen | |
| 2013/0298127 A1* | 11/2013 | Meier | G06F 9/3834 718/100 |
| 2015/0106595 A1* | 4/2015 | Khot | G06F 9/3851 712/215 |
| 2016/0011877 A1* | 1/2016 | Mukherjee | G06F 9/3857 712/208 |
| 2017/0351522 A1* | 12/2017 | Ayub | G06F 9/30043 |

OTHER PUBLICATIONS

Alipour, et al., "FIFOrder MicroArchitecture: Ready-Aware Instruction Scheduling for OoO Processors", In Proceedings of Design, Automation & Test in Europe Conference & Exhibition, Mar. 25, 2019, pp. 716-721.

"International Search Report and Written Opinion Issued in PCT Application No. PCT/US21/017304", dated May 31, 2021, 13 Pages.

* cited by examiner

OPERAND POOL INSTRUCTION RESERVATION CLUSTERING IN A SCHEDULER CIRCUIT IN A PROCESSOR

FIELD OF THE DISCLOSURE

The technology of the disclosure relates to computer processors ("processors"), and more particularly to scheduler circuits that schedule execution of instructions in an instruction pipeline in a processor.

BACKGROUND

Microprocessors, also known as "processors," perform computational tasks for a wide variety of applications. A conventional microprocessor includes a central processing unit (CPU) that includes one or more processor cores, also known as "CPU cores." The CPU executes computer program instructions ("instructions"), also known as "software instructions," to perform operations based on data and generate a result, which is a produced value. An instruction that generates a produced value is a "producer" instruction. The produced value may then be stored in memory, provided as an output to an input/output ("I/O") device, or made available (i.e., communicated) as an input value to another "consumer" instruction executed by the CPU, as examples. Thus, a consumer instruction is dependent on the produced value produced by a producer instruction as an input value to the consumer instruction for execution. These producer and consumer instructions are also referred to collectively as dependent instructions.

Instruction pipelining is a processing technique whereby the throughput of instructions being executed by a processor may be increased by splitting the handling of each instruction into a series of steps. These steps are executed in one or more instruction pipelines each composed of multiple stages in an instruction processing circuit in a processor. Optimal processor performance may be achieved if all stages in an instruction pipeline are able to process instructions concurrently and sequentially as the instructions are ordered in the instruction pipeline. Also, many modern processors are out-of-order processors that are capable of dataflow execution of instructions based on availability of input data to be consumed by the instructions rather than the program order of the instructions. Thus, the out-of-order processor may execute an instruction as soon as all input data to be consumed by the instruction has been produced. While dataflow order processing of instructions may cause the specific order in which instructions are executed to be unpredictable, dataflow order execution in an out-of-order processor may realize performance gains. For example, instead of having to "stall" (i.e., intentionally introduce a processing delay) while input data to be consumed is retrieved for an older instruction, the out-of-order processor may proceed with executing a more recently fetched instruction that is able to execute immediately. In this manner, processor clock cycles that would otherwise be unused for instruction processing and execution may be productively utilized by the out-of-order processor.

An instruction processing circuit in a processor includes an instruction fetch circuit that is configured to fetch instructions to be executed from an instruction memory (e.g., system memory or an instruction cache memory). The instruction memory may be provided in or as part of a system memory in the processor-based system, as an example. The fetched instructions are decoded and inserted into an instruction pipeline in the instruction processing circuit to be pre-processed before reaching an execution circuit to be executed. The decoded instructions are also provided to a reservation circuit in a scheduler circuit. The scheduler circuit is configured to issue a decoded instruction from the reservation circuit to an execution circuit to be executed once all source register operands (e.g., immediate values, values stored in memory, and produced values from a producer instruction) are available and any structural hazards for the decoded instruction are resolved. For example, the scheduler circuit is responsible for making sure that the necessary values for operands of a decoded consumer instruction are available before issuing the decoded consumer instruction to an execution circuit for execution. The execution circuit is configured to execute decoded instructions received from the scheduler circuit.

The scheduler circuit is configured to broadcast a wake-up signal on a wake-up bus to "wake up" a consumer instruction in response to issuance of a producer instruction to the execution circuit. The wake-up signal indicates that a produced value from execution of the issued producer instruction will be available, and thus the consumer instruction of the producer instruction can now be issued to the execution circuit behind the producer instruction. In other words, once a producer instruction is scheduled by the scheduler circuit to be issued from the reservation circuit to the execution circuit, it is known that a produced value from execution of the producer instruction will soon become available for its consumer instruction. Because the wake-up signal is generated in response to a producer instruction being issued, its consumer instruction can only be woken up at least one (1) clock cycle behind the producer instruction so that the producer instruction is guaranteed to have executed before the consumer instruction executes with the produced value of the consumer instruction. Thus, a critical timing path in an instruction processing circuit in a processor is the wake-up path in the scheduler circuit to wake up instructions to be issued to the execution circuit. The wake-up or scheduling latency of an instruction is the number of clock cycles after its issuance that its produced value is available to be consumed by a consumer instruction. Some producer instructions are single clock cycle ("single-cycle") latency producers, meaning that the execution circuit can generate and make available a produced value for the producer instruction in one (1) clock cycle. Other producer instructions are multiple clock cycle latency producers, meaning that the execution circuit generates and makes available a produced value for the producer instruction in more than one (1) clock cycle. An important part of the wake-up design in the scheduler circuit is that a consumer instruction that is dependent on a single-cycle latency producer instruction can be issued by the scheduler circuit in back-to-back clock cycles with the producer instruction to reduce scheduling latency.

A conventional scheduler circuit includes a reservation circuit that has 'M' reservation entries to store M instructions waiting to be issued for execution. The scheduler circuit also includes a pick circuit that controls when the M instructions in the reservation circuit are issued in issue lanes to be executed by an execution circuit. The pick circuit determines which instruction is to be issued based on comparator circuitry comparing register information in a received wake-up signal on the wake-up bus indicating that a specified register is ready to be consumed as a source operand of an instruction. Each reservation entry in the reservation circuit is capable of receiving a wake-up signal from 'K' producer instructions capable of being issued by the scheduler circuit in each clock cycle. Thus, in this example, 'M' is referred to as the instruction window size, and 'K' is referred to as the issue width or the number of issue lanes to the execution circuit in which producer instructions can be issued to the execution circuit to be executed. In general, a larger M entry size and larger K issue width are desired for increased processor performance. As discussed above, an important part of the wake-up design in the scheduler circuit is that a consumer instruction that is dependent on a single-cycle latency producer instruction can be issued in back-to-back clock cycles with the producer instruction. Three (3) main components of the wake-up timing path in a scheduler circuit that affect a single-cycle wake-up are: (1) propagation time (i.e., timing delay) in coupling K wake-up signals on a wake-up bus from K issue lanes to the pick circuit as a result of K producer instructions issued in the issue lanes; (2) wake-up time in the pick circuit which employs a scheme to compare wake-up signals to reserved instructions to pick up to K instructions to issue from the M entries in the reservation circuit; and (3) the propagation time in coupling K pick signals generated by the pick circuit to M entries in the reservation circuit to select K of the M entries to be issued in the K issue lanes. It may be desired to increase the instruction window size M in a reservation circuit in an instruction processing circuit of a processor to increase processor performance. The greater the instruction window size, the more likely there are K available instructions that are always ready to be issued in the K issue lanes to maximize the efficiency of the execution circuit. However, increasing the instruction window size M for increased performance can have an adverse effect on latency on all three (3) components of the wake-up timing path. For example, wake-up time in the pick circuit is affected by the load on the wake-up bus connected to the comparators in the pick circuit. As the number of entries in a reservation circuit increases, capacitive load on the wake-up bus increases as it has to drive extra comparator circuitry in the pick circuit.

SUMMARY

Exemplary aspects disclosed herein include an operand pool instruction reservation clustering in a scheduler circuit in a processor. The processor includes an instruction processing circuit that includes a number of instruction processing stages configured to pipeline the processing and execution of fetched instructions according to a dataflow execution. A scheduler circuit is included in an instruction processing stage in the instruction processing circuit to schedule issuance of instructions to the execution circuit to be executed. The scheduler circuit includes a reservation circuit that controls issuance of such instructions until its source operands are ready to be consumed. The scheduler circuit also includes a pick circuit that includes comparator circuitry configured compare register information in a received wake-up signal indicating which registers are available to be consumed, to source operands of the reserved instructions in the reservation circuit to determine if any of the reserved instructions are ready to be issued. The scheduler circuit is responsible for issuing an instruction into an issue lane for execution by the execution circuit once it is known that the necessary values for source operand(s) of the instruction will be available when the instruction is executed. Thus, a consumer instruction is issued by the scheduler circuit once it is known that a necessary produced value(s) from a producer instruction(s) will be available to be consumed before the consumer instruction is executed.

The scheduler circuit should ideally be designed such that a consumer instruction that is dependent on a single-cycle latency producer instruction can be issued in back-to-back clock cycles with the producer instruction for performance. The latency of the producer instruction is the number of clock cycles ("cycles") after its issuance that its produced value will be available to be consumed by the consumer instruction. It may also be desired to design the scheduler circuit such that a consumer instruction dependent on a single-cycle latency producer instruction can be issued in back-to-back clock cycles with the producer instruction for performance. It may also be desired to increase the number of the reservation entries in the scheduler circuit to increase scheduling performance, because increasing reservation entries increases the likelihood that there will be sufficient instructions ready to be issued in each of the issue lanes. However, increasing the reservation entries in the scheduler circuit increases the number of scheduling path connections and complexity in the scheduler circuit, thus increasing scheduling latency. The scheduling latency may increase such that all single-cycle latency producer instructions may not be able to be issued by the scheduler circuit in back-to-back clock cycles with the producer instruction.

Thus, in exemplary aspects disclosed herein, an operand pool clustered scheduler circuit ("scheduler circuit") is provided in an instruction processing circuit of a processor. The operand pool clustered scheduler circuit includes a plurality of operand pool reservation circuits each having an assigned number of source operands for a reserved instruction that must be ready before the instruction is issued. Instructions that have the same number of source operands that must be ready for its issuance are reserved (i.e., stored) in reservation entries in an operand pool reservation circuit having the same assigned number of source operands. For example, consumer instructions that are dependent on a two (2) source operands can be clustered together in the same operand pool reservation circuit that is assigned to reserve and issue instructions having two (2) source operands. Similarly, consumer instructions that are not dependent on any source operands, meaning that such instructions will be ready to be issued without waiting for a source operand to be ready, can be clustered together in the same operand pool reservation circuit that is assigned to reserve and issue instructions having no source operands. In this manner, the number of reservation entries and associated comparator circuits in the operand pool clustered scheduler circuit is distributed among the plurality of operand pool reservation circuits to avoid or reduce an increase in the number of scheduling path connections and complexity in each reservation circuit. This can avoid or reduce an increase in scheduling latency for a given number of reservation entries in the operand pool clustered scheduler circuit. The scheduling path connections are reduced for a given number of reservation entries over a non-clustered pick circuit, because signals (e.g., wake-up signals, pick-up signals) used for scheduling instructions to be issued in each operand pool reservation circuit do not have to have the same clock cycle latency so as to not impact performance.

In this regard, in one exemplary aspect, a scheduler circuit is provided in a processor and is configured to receive a plurality of instructions comprising producer instructions and consumer instructions to be scheduled for execution. The scheduler circuit comprises at least one operand pool reservation circuit assigned to store instructions having an assigned number of source operands. Each operand pool reservation circuit of the at least one operand pool reservation circuit comprises a plurality of reservation entries each configured to store an instruction having a number of source operands equal to the assigned number of source operands for the operand pool reservation circuit to be issued for execution. The scheduler circuit is configured to receive a consumer instruction among the plurality of instructions dependent on a producer instruction among the plurality of instructions. The scheduler circuit is also configured to store the received consumer instruction in a reservation entry among the plurality of reservation entries in an operand pool reservation circuit among the at least one operand pool reservation circuit assigned with the same number of source operands as a number of non-ready source operands in the received consumer instruction. Each operand pool reservation circuit of the at least one operand pool reservation circuit is configured to receive a wake-up signal among one or more wake-up signals each associated with one or more issue lane circuits in the processor, the wake-up signal comprising at least one register tag indicating at least one source operand of at least one producer instruction issued to an issue lane circuit among the one or more issue lane circuits. Each operand pool reservation circuit of the at least one operand pool reservation circuit is also configured to compare the at least one register tag to the plurality of reservation entries in the operand pool reservation circuit assigned with the same number of source operands as the number of non-ready source operands in the received consumer instruction. In response to at least one source register of a consumer instruction in a reservation entry among the plurality of reservation entries matching the at least one register tag, each operand pool reservation circuit of the at least one operand pool reservation circuit is also configured to issue an instruction ready signal for the consumer instruction in the reservation entry to at least one pick circuit configured to issue the consumer instruction to an issue lane circuit among the one or more issue lane circuits to be executed.

In another exemplary aspect, a method of scheduling a plurality of instructions comprising producer instructions and consumer instructions to be executed in an execution circuit in a processor is provided. The method comprises receiving a consumer instruction among the plurality of instructions dependent on a producer instruction among the plurality of instructions. The method also comprises storing the received consumer instruction in a reservation entry among a plurality of reservation entries in an operand pool reservation circuit among at least one operand pool reservation circuit assigned with a same number of source operands as a number of non-ready source operands in the received consumer instruction. Each of the at least one operand pool reservation circuit comprises a plurality of reservation entries each configured to store an instruction having a number of non-ready source operands equal to the assigned number of source operands for the operand pool reservation circuit to be issued for execution. The method also comprises receiving a wake-up signal among one or more wake-up signals each associated with one or more issue lane circuits in the processor, the wake-up signal comprising at least one register tag indicating at least one source operand of at least one producer instruction issued to an issue lane circuit among the one or more issue lane circuits. The method also comprises comparing the at least one register tag to the plurality of reservation entries in the operand pool reservation circuit assigned with the same number of source operands as the number of non-ready source operands in the received consumer instruction. The method also comprises issuing an instruction ready signal for the consumer instruction in the reservation entry to at least one pick circuit configured to issue the consumer instruction to an issue lane circuit among the one or more issue lane circuits to be executed, in response to at least one source register of a consumer instruction in a reservation entry among the plurality of reservation entries matching the at least one register tag.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
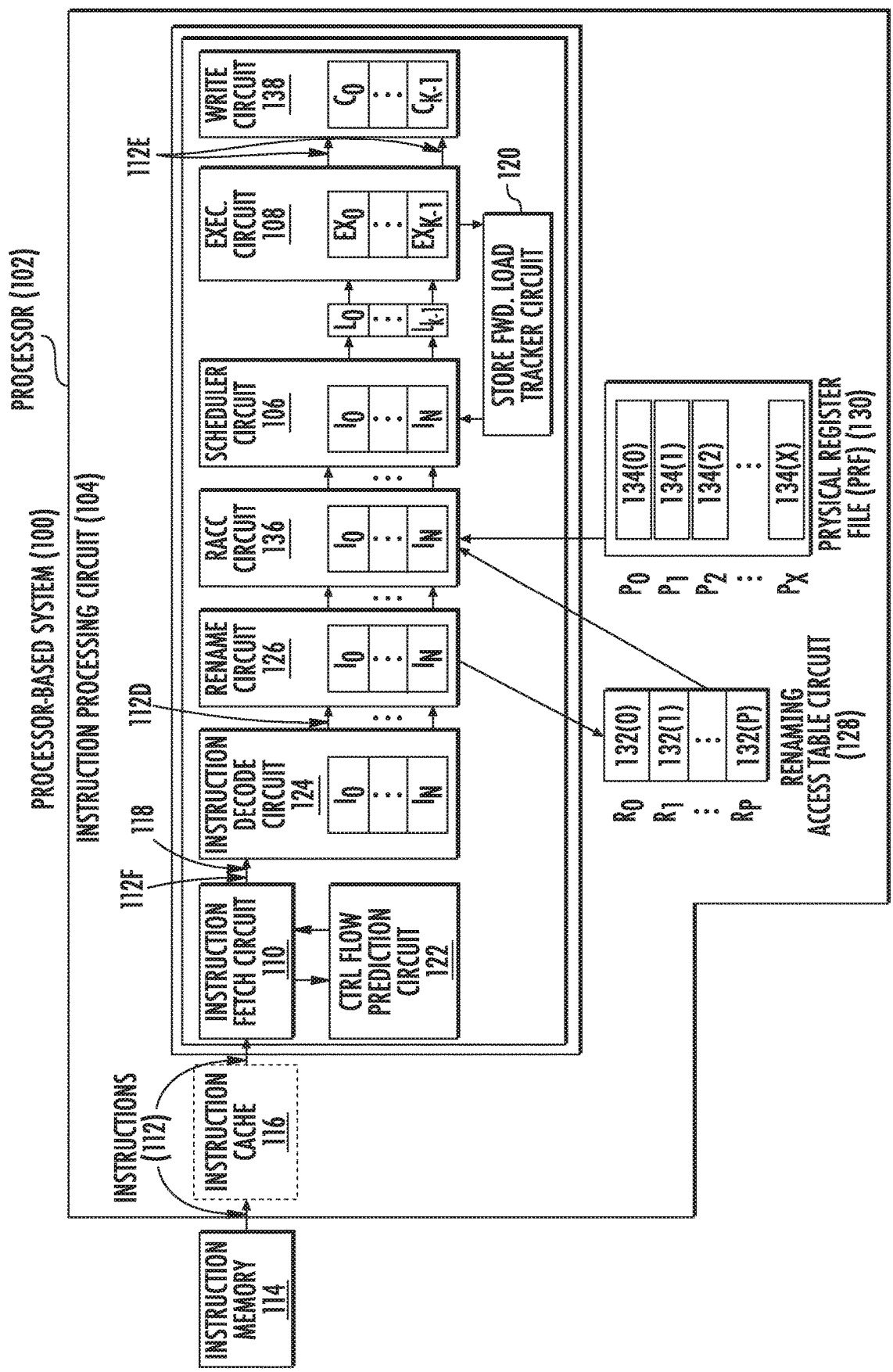
FIG. 1 is a diagram of an exemplary processor-based system that includes a processor with an instruction processing circuit that includes one or more instruction pipelines for processing computer instructions for execution, wherein the instruction processing circuit includes a scheduler circuit configured to reserve and schedule issuance of instructions to an execution circuit to be executed.
Figure 3:
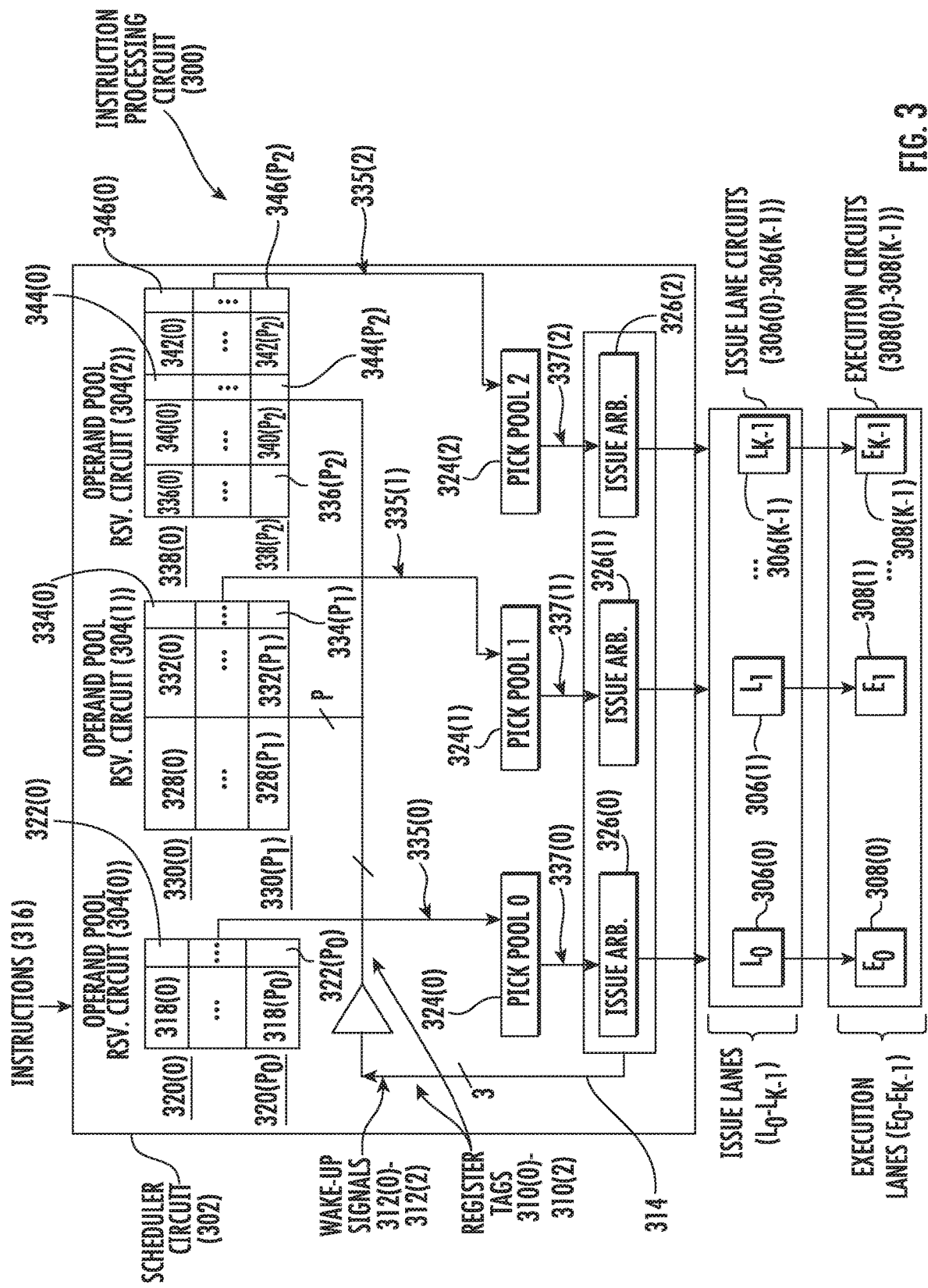
Figure 4:
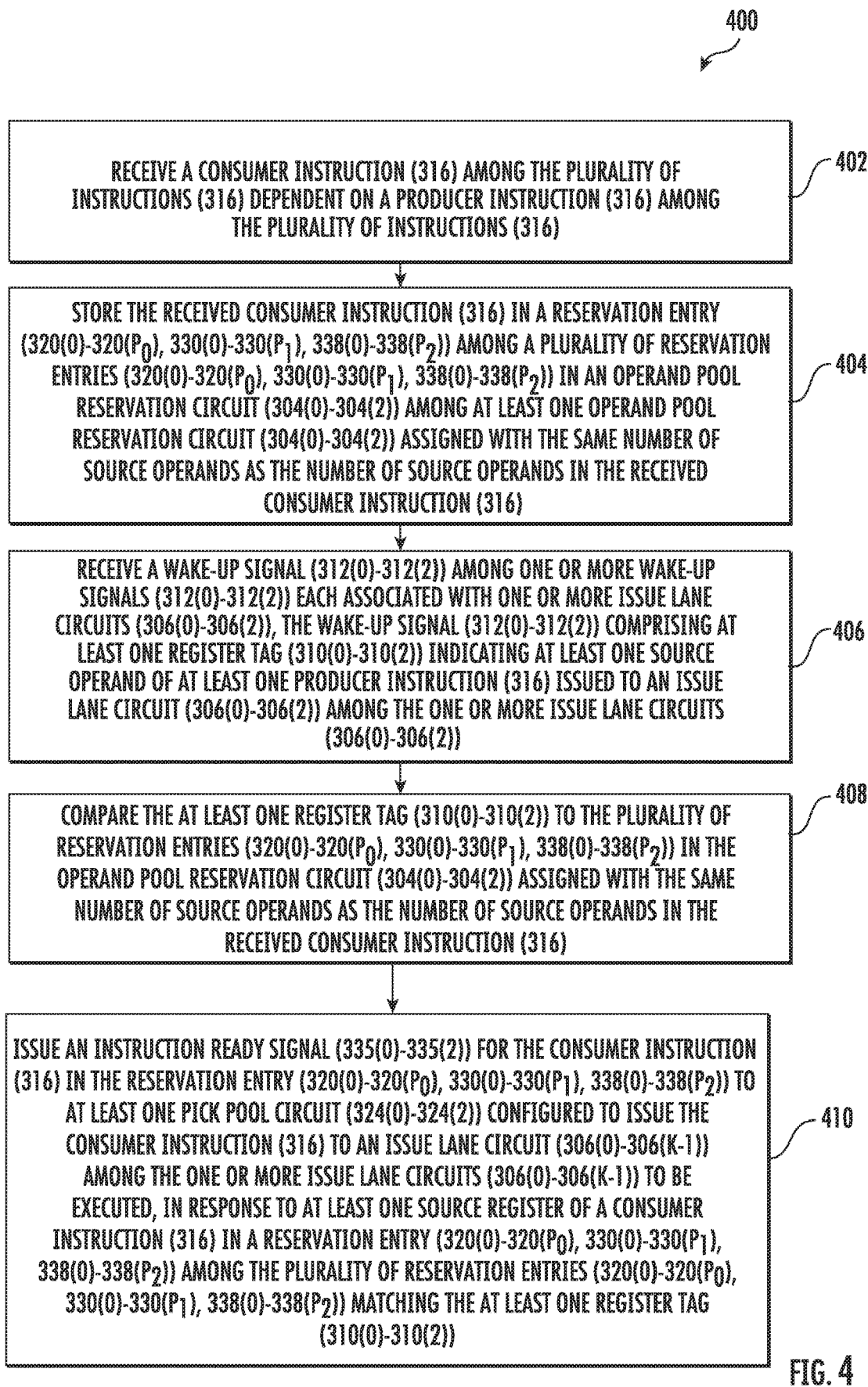
Figure 5:
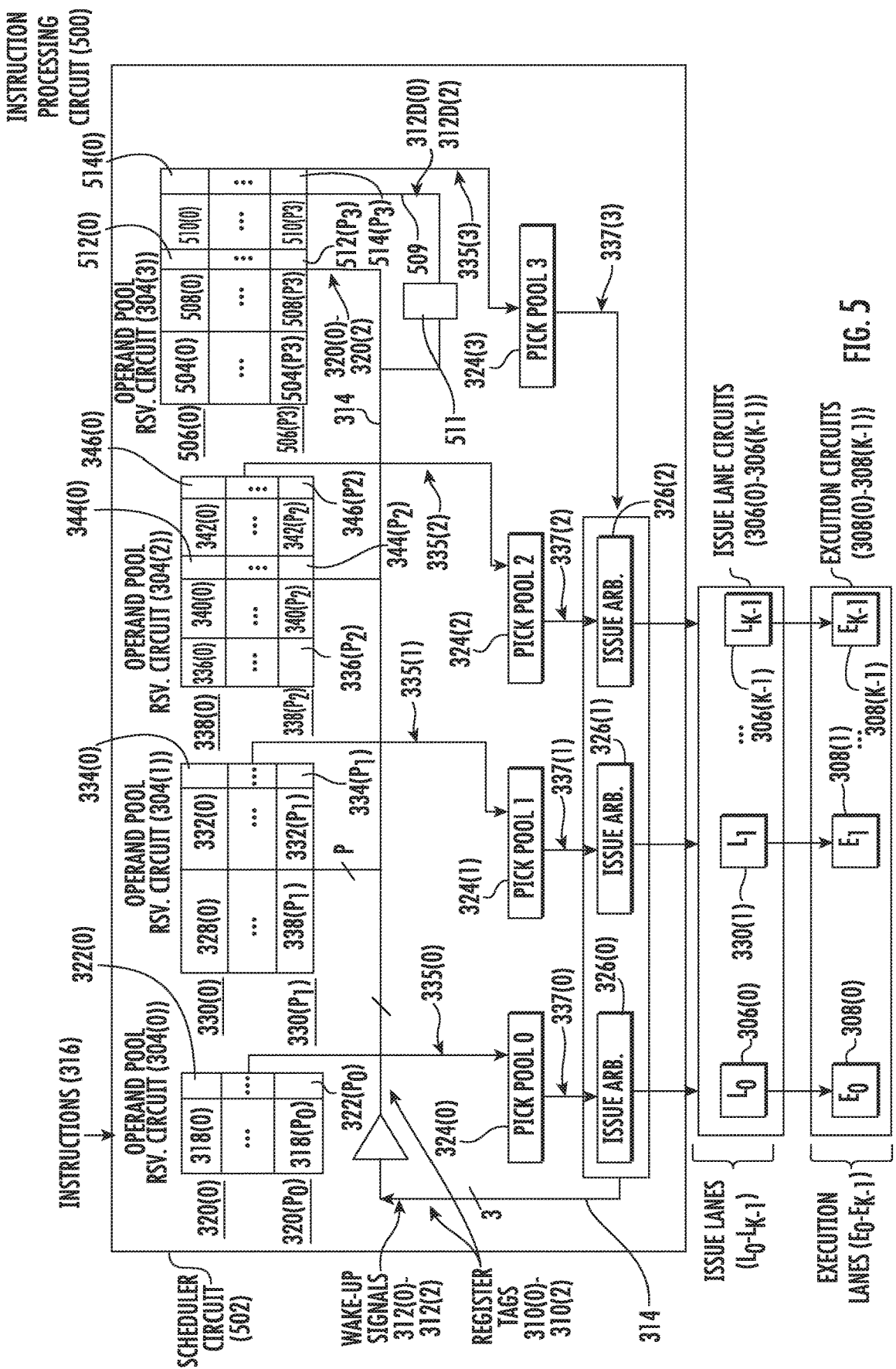
Figure 6:
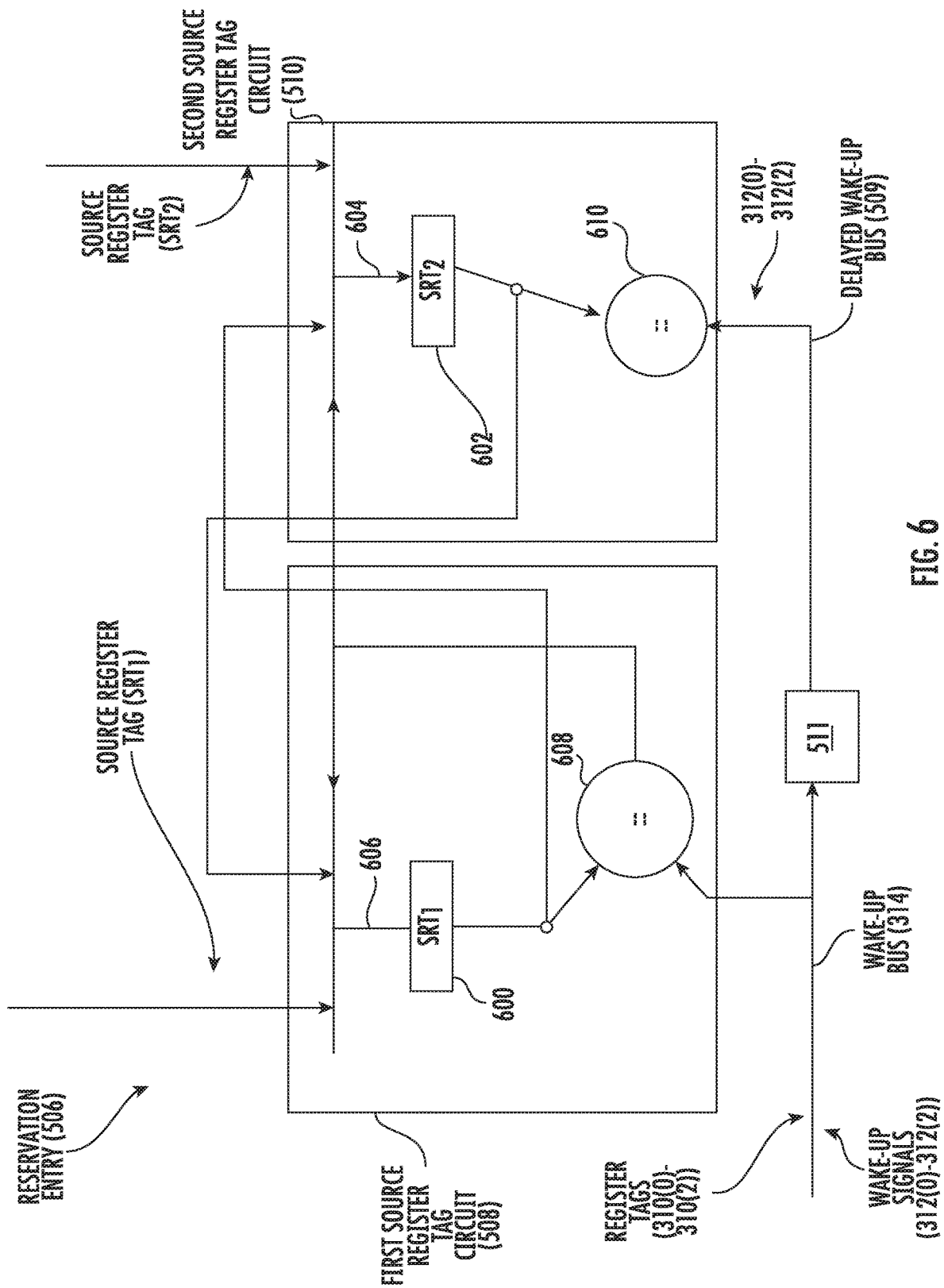
Figure 7:
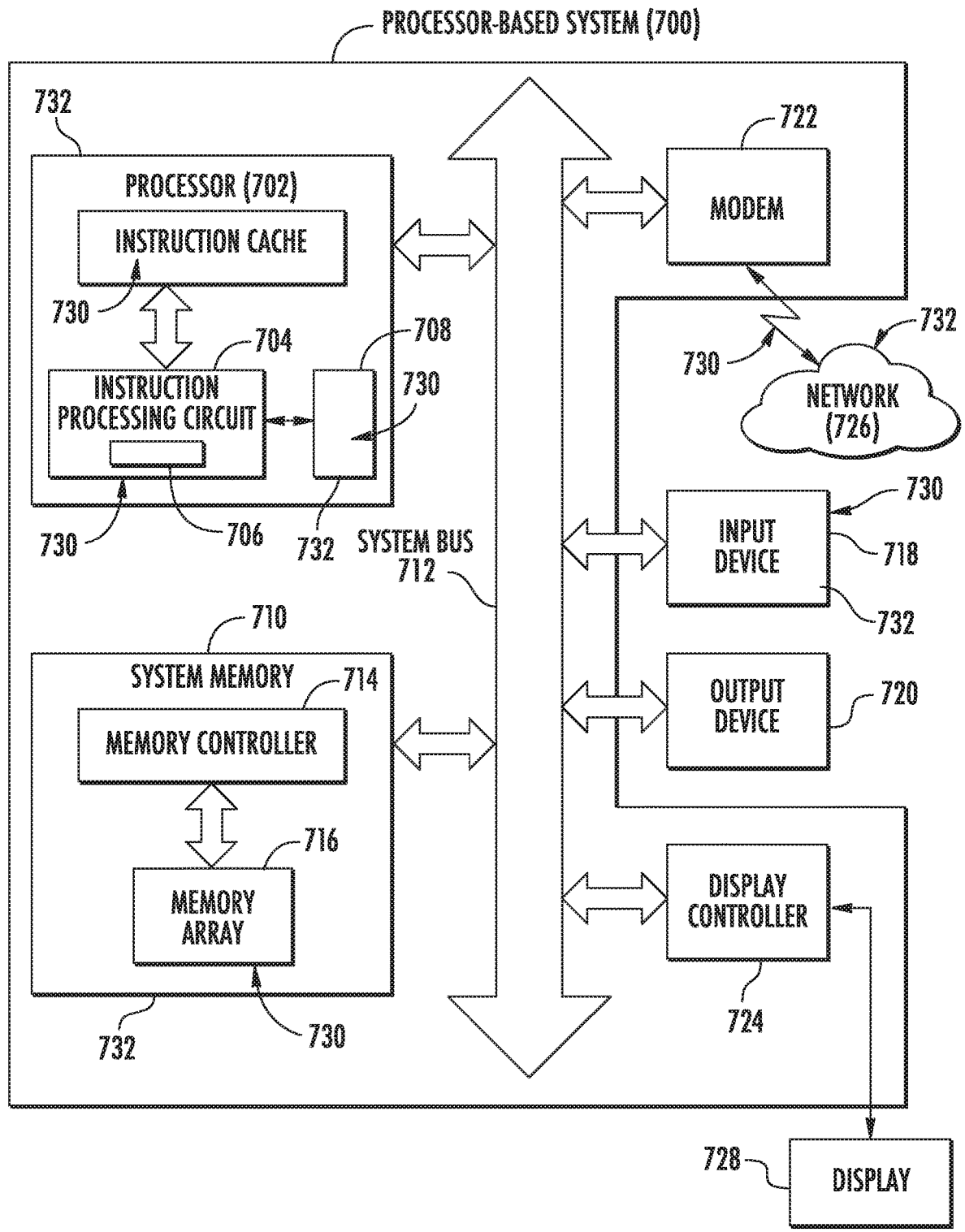

FIG. 3 is a diagram of an exemplary operand pool clustered scheduler circuit that can be included in the instruction processing circuit in FIG. 1, wherein the operand pool clustered scheduler circuit includes a plurality of operand pool reservation circuits each configured to cluster instructions having the same number of source operands that must be ready for its issuance by respective pick circuits to an issue lane for execution by an execution circuit;

FIG. 4 is a flowchart illustrating an exemplary process of the operand pool clustered scheduler circuit in FIG. 3 being assigned to an operand pool reservation circuit assigned to the number of source operands that must be ready for the instruction to be issued, and the picking of such instructions into an issue lane for execution by an execution circuit;

FIG. 5 is a diagram of another exemplary operand pool clustered scheduler circuit that can be included in the instruction processing circuit in FIG. 1, wherein the operand pool clustered scheduler circuit includes a plurality of operand pool reservation circuits, wherein at least one of the operand pool reservation circuits has reservation entries having live and non-live source register tags capable of being swapped to avoid an additional wake-up latency penalty for issuing an instruction shows source operands do not become ready in the same clock cycle;

FIG. 6 is a diagram of an exemplary reservation entry in an operand pool reservation circuit in the operand pool clustered scheduler circuit in FIG. 5 capable of swapping source register tags between live and non-live source register tag circuits; and FIG. 7 is a block diagram of an exemplary processor-based system that includes a processor with an instruction processing circuit that includes an operand pool clustered scheduler circuit that includes a plurality of operand pool reservation circuits each configured to cluster instructions having the same number of source operands that must be ready for its issuance by respective pick circuits to an issue lane for execution by an execution circuit, including but not limited to the operand pool clustered scheduler circuits in FIGS. 3 and 5.

DETAILED DESCRIPTION

Exemplary aspects disclosed herein include an operand pool instruction reservation clustering in a scheduler circuit in a processor. The processor includes an instruction processing circuit that includes a number of instruction processing stages configured to pipeline the processing and execution of fetched instructions according to a dataflow execution. A scheduler circuit is included in an instruction processing stage in the instruction processing circuit to schedule issuance of instructions to the execution circuit to be executed. The scheduler circuit includes a reservation circuit that controls issuance of such instructions until its source operands are ready to be consumed. The scheduler circuit also includes a pick circuit that includes comparator circuitry configured compare register information in a received wake-up signal indicating which registers are available to be consumed, to source operands of the reserved instructions in the reservation circuit to determine if any of the reserved instructions are ready to be issued. The scheduler circuit is responsible for issuing an instruction into an issue lane for execution by the execution circuit once it is known that the necessary values for source operand(s) of the instruction will be available when the instruction is executed. Thus, a consumer instruction is issued by the scheduler circuit once it is known that a necessary produced value(s) from a producer instruction(s) will be available to be consumed before the consumer instruction is executed.

The scheduler circuit should ideally be designed such that a consumer instruction that is dependent on a single-cycle latency producer instruction can be issued in back-to-back clock cycles with the producer instruction for performance. The latency of the producer instruction is the number of clock cycles ("cycles") after its issuance that its produced value will be available to be consumed by the consumer instruction. It may also be desired to design the scheduler circuit such that a consumer instruction dependent on a single-cycle latency producer instruction can be issued in back-to-back clock cycles with the producer instruction for performance. It may also be desired to increase the number of the reservation entries in the scheduler circuit to increase scheduling performance, because increasing reservation entries increases the likelihood that there will be sufficient instructions ready to be issued in each of the issue lanes. However, increasing the reservation entries in the scheduler circuit increases the number of scheduling path connections and complexity in the scheduler circuit, thus increasing scheduling latency. The scheduling latency may increase such that all single-cycle latency producer instructions may not be able to be issued by the scheduler circuit in back-to-back clock cycles with the producer instruction.

Thus, in exemplary aspects disclosed herein, an operand pool clustered scheduler circuit ("scheduler circuit") is provided in an instruction processing circuit of a processor. The operand pool clustered scheduler circuit includes a plurality of operand pool reservation circuits each having an assigned number of source operands for a reserved instruction that must be ready before the instruction is issued. Instructions that have the same number of source operands that must be ready for its issuance are reserved (i.e., stored) in reservation entries in an operand pool reservation circuit having the same assigned number of source operands. For example, consumer instructions that are dependent on two (2) source operands can be clustered together in the same operand pool reservation circuit that is assigned to reserve and issue instructions having two (2) source operands. Similarly, consumer instructions that are not dependent on any source operands, meaning that such instructions will be ready to be issued without waiting for a source operand to be ready, can be clustered together in the same operand pool reservation circuit that is assigned to reserve and issue instructions having no source operands. In this manner, the number of reservation entries and associated comparator circuits in the operand pool clustered scheduler circuit is distributed among the plurality of operand pool reservation circuits to avoid or reduce an increase in the number of scheduling path connections and complexity in each reservation circuit. This can avoid or reduce an increase in scheduling latency for a given number of reservation entries in the operand pool clustered scheduler circuit. The scheduling path connections are reduced for a given number of reservation entries over a non-clustered pick circuit, because signals (e.g., wake-up signals, pick-up signals) used for scheduling instructions to be issued in each operand pool reservation circuit do not have to have the same clock cycle latency so as to not impact performance.

Figure 2:
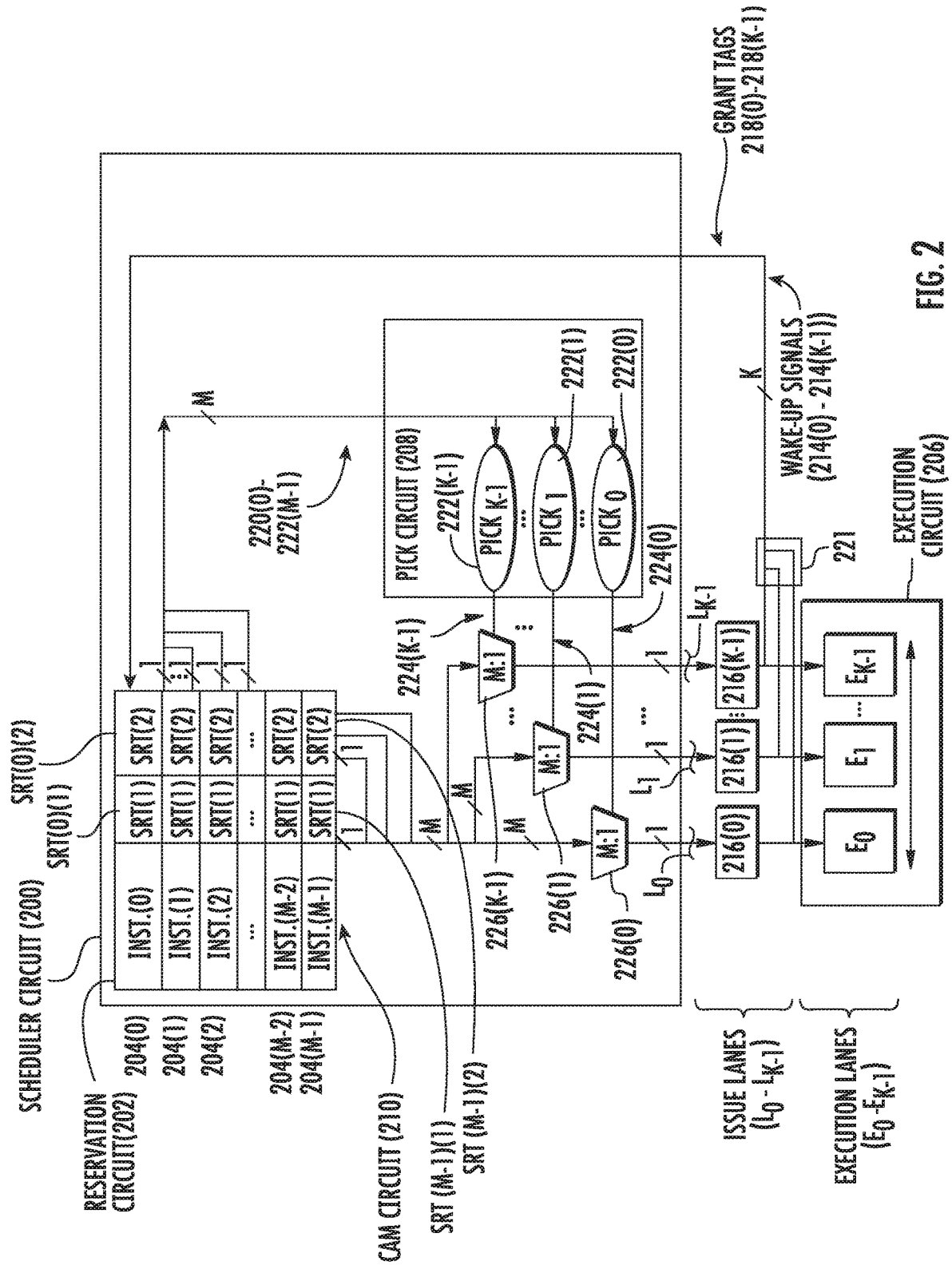
FIG. 2 is a diagram of an exemplary non-clustered scheduler circuit that can be included in the instruction processing circuit in FIG. 1, and which is configured to schedule issuance of instructions to issue lanes to be executed by an execution circuit.

Before discussing an exemplary processor-based system that includes a processor that includes an operand pool clustered scheduler circuit that includes a plurality of operand pool reservation circuits each configured to cluster instructions having the same number of source operands that must be ready for its issuance by respective pick circuits to an issue lane for execution by an execution circuit starting at FIG. 3, a processor-based system that includes a processor that includes a non-operand pool clustered scheduler circuit for scheduling instructions to be executed is first discussed with regard to FIGS. 1-2 below.

In this regard, FIG. 1 is a schematic diagram of an exemplary processor-based system 100 that includes a processor 102. The processor 102 includes an instruction processing circuit 104 that includes a scheduler circuit 106 for scheduling instructions to be executed in the processor 102. The processor 102 includes the instruction processing circuit 104 that includes one or more instruction pipelines $I_0$-$I_N$ for processing computer instructions for execution. As will be discussed in more detail below, the instruction processing circuit 104 includes the scheduler circuit 106 configured to reserve and schedule issuance of instructions to an execution circuit 108 to be executed. The processor 102 may be an in-order or an out-of-order processor (OoP) as examples. The instruction processing circuit 104 includes an instruction fetch circuit 110 that is configured to fetch instructions 112 from an instruction memory 114. The instruction memory 114 may be provided in or as part of a system memory in the processor-based system 100 as an example. An instruction cache 116 may also be provided in the processor 102 to cache the instructions 112 fetched from the instruction memory 114 to reduce timing delay in the instruction fetch circuit 110. The instruction fetch circuit 110 in this example is configured to provide the instructions 112 as fetched instructions 112F into the one or more instruction pipelines $I_0$-$I_N$ as an instruction stream 118 in the instruction processing circuit 104 to be pre-processed, before the fetched instructions 112F reach the execution circuit 108 to be executed.

The fetched instructions 112F in the instruction stream 118 include producer instructions and consumer instructions that consume produced values as a result of the instruction processing circuit 104 executing producer instructions. The instruction pipelines $I_0$-$I_N$ are provided across different processing circuits or stages of the instruction processing circuit 104 to pre-process and process the fetched instructions 112F in a series of steps that can be performed concurrently to increase throughput prior to execution of the fetched instructions 112F by the execution circuit 108. For example, fetched store-based instructions 112F identified as having store-forward loads in the instruction stream 118 can be identified by a store forward load tracker circuit 120 in the instruction processing circuit 104 before being executed to be forwarded to be consumed by fetched consuming load-based instructions 112F.

A control flow prediction circuit 122 (e.g., a branch prediction circuit) is also provided in the instruction processing circuit 104 in the processor 102 in FIG. 1 to speculate or predict the outcome of a predicate of a fetched conditional control instruction 112F, such as a conditional branch instruction, that affects the instruction control flow path of the instruction stream 118 processed in the instruction pipelines $I_0$-$I_N$. The prediction of the control flow prediction circuit 122 can be used by the instruction fetch circuit 110 to determine the next fetched instructions 112F to fetch based on the predicted target address. The instruction processing circuit 104 also includes an instruction decode circuit 124 configured to decode the fetched instructions 112F fetched by the instruction fetch circuit 110 into decoded instructions 112D to determine the instruction type and actions required. The instruction type and action required encoded in the decoded instruction 112D may also be used to determine in which instruction pipeline $I_0$-$I_N$ the decoded instructions 112D should be placed.

In this example, the decoded instructions 112D are placed in one or more of the instruction pipelines $I_0$-$I_N$ and are next provided to a rename circuit 126 in the instruction processing circuit 104. The rename circuit 126 is configured to determine if any register names in the decoded instructions 112D need to be renamed to break any register dependencies that would prevent parallel or out-of-order processing. The rename circuit 126 is configured to call upon a renaming access table circuit 128 to rename a logical source register operand and/or write a destination register operand of a decoded instruction 112D to available physical registers $P_0$, $P_1$, . . . , $P_X$ in a physical register file (PRF) 130. The renaming access table circuit 128 contains a plurality of register mapping entries 132(0)-132(P) each mapped to (i.e., associated with) a respective logical register $R_0$-$R_P$. The register mapping entries 132(0)-132(P) are each configured to store respective mapping information for corresponding to the logical registers $R_0$-$R_P$ pointing to a physical register $P_0$-$P_X$ in the PRF 130. Each physical register $P_0$-$P_X$ is configured to store a data entry 134(0)-134(X) for the source and/or destination register operand of a decoded instruction 112D.

The instruction processing circuit 104 in the processor 102 in FIG. 1 also includes a register access circuit 136 prior to the scheduler circuit 106. The register access circuit 136 is configured to access a physical register $P_0$-$P_X$ in the PRF 130 based on a register mapping entry 132(0)-132(P) mapped to a logical register $R_0$-$R_P$ in the renaming access table circuit 128 of a source register operand of a decoded instruction 112D to retrieve a produced value from an executed instruction 112E in the execution circuit 108. The register access circuit 136 is also configured to provide the retrieved produced value from an executed decoded instruction 112E as the source register operand of a decoded instruction 112D to be executed.

Also, in the instruction processing circuit 104, the scheduler circuit 106 is provided in the instruction pipeline $I_0$-$I_N$ and is configured to store decoded instructions 112D in reservation entries until all source register operands for the decoded instruction 112D are available. For example, the scheduler circuit 106 is responsible for determining that the necessary values for operands of a decoded consumer instruction 112D are available before issuing the decoded consumer instruction 112D in an issue lane $L_0$-$L_{K-1}$ among 'K' issue lanes to the execution circuit 108 for execution. The scheduler circuit 106 issues decoded instructions 112D ready to be executed to the execution circuit 108. The number of issue lanes $L_0$-$L_{K-1}$ is typically less than the number of reservation entries in the scheduler circuit 106, so the scheduler circuit 106 employs circuits to dispatch decoded instructions 112D ready to be executed in the issue lanes $L_0$-$L_{K-1}$ according to an issuance scheme.

The issuance scheme may be based on the latency of the producer instruction that generates the produced value(s) for a source operand of a decoded instruction 112D. For example, a producer instruction that can be executed and its produced data made available by the execution circuit 108 in one (1) clock cycle is a single clock cycle latency producer instruction. The execution circuit 108 may include multiple execution stages to execute producer instructions that require more than one (1) clock cycle to be executed. The source operands of a decoded instruction 112D can include immediate values, values stored in memory, and produced values from other decoded instructions 112D that would be considered producer instructions to the consumer instruction. The execution circuit 108 is configured to execute decoded instructions 112D issued in an issue lane $L_0$-$L_{K-1}$ from the scheduler circuit 106. A write circuit 138 is also provided in the instruction processing circuit 104 to write back or commit produced values from executed instructions 112E to memory, such as the PRF 130, cache memory, or system memory.

FIG. 2 is a diagram of an exemplary scheduler circuit 200 that can be employed as the scheduler circuit 106 in the instruction processing circuit 104 in FIG. 1 to illustrate exemplary components of the scheduler circuit 200. The scheduler circuit 200 includes a reservation circuit 202 that includes an 'M' number of reservation entries 204(0)-204(M−1) in this example. The reservation entries 204(0)-204(M−1) are configured to store received instructions in an instruction pipeline(s) until ready to be executed in an execution circuit 206, which may be the execution circuit 108 in FIG. 1. In this example, each reservation entry 204(0)-204(M−1) includes an instruction field INST(0)-INST(M−1) configured to store an instruction received by the scheduler circuit 200 to be issued. Each reservation entry 204(0)-204(M−1) also includes two (2) source register tag (SRT) circuits SRT(0)(1)-SRT(M−1)(2) each configured to store a source register tag identifying a source register operand in a corresponding instruction stored in the instruction field INST(0)-INST(M−1) of the reservation entry 204(0)-204(M−1). For example, SRT circuits SRT(0)(1)-SRT(M−1)(2) may be source physical register tag (SPRT) circuits identifying a physical source register operand in a corresponding instruction stored in the instruction field INST(0)-INST(M−1) of the reservation entry 204(0)-204(M−1). The source operand(s) of the instruction stored in an instruction field INST(0)-INST(M−1) of a reservation entry 204(0)-204(M−1) instruction are stored in the corresponding SRT circuit(s) SRT(0)(1)-SRT(M−1)(2). The source register tags are used to identify the named register operands of a stored instruction so it can be determined when a source register(s) of source register operand(s) named in a consumer instruction stored in a reservation entry 204(0)-204(M−1) is ready such that the instruction can be issued.

The scheduler circuit 200 is configured to issue instructions ready to be executed to one of the issue lanes $L_0$-$L_{K-1}$ that are coupled to respective execution lanes $E_0$-$E_{K-1}$ in the execution circuit 206. The execution circuit 206 is designed to be able to receive and concurrently execute 'K' number of instructions dispatched in K issue lanes $L_0$-$L_{K-1}$, and K execution lanes $E_0$-$E_{K-1}$ are provided for increased performance. Thus, in this example, 'M' is referred to as the instruction window size, and 'K' is referred to as the issue width or the number of issue lanes $L_0$-$L_{K-1}$ in which producer instructions can be issued to the execution circuit 206 to be executed. If the scheduler circuit 200 was included as the scheduler circuit 106 in FIG. 1, the reservation entries 204(0)-204(M−1) would be configured to store decoded instructions 112D from the instruction pipelines $I_0$-$I_N$ before being passed to the execution circuit 108 to be executed. The reservation entries 204(0)-204(M−1) store producer instructions and consumer instructions of the producer instructions. The scheduler circuit 200 ensures that the producer instruction is issued to an issue lane $L_0$-$L_{K-1}$ to be executed by execution circuit 206 before its consumer instruction is issued in an issue lane $L_0$-$L_{K-1}$. The scheduler circuit 200 is a synchronous circuit that is configured to operate and execute functions in cycles of a clock signal of its processor.

With continuing reference to FIG. 2, the scheduler circuit 200 also includes a pick circuit 208 that is configured to pick instructions reserved in the reservation entries 204(0)-204(M−1) when ready to be issued. The pick circuit 208 is also coupled to K wake-up signals 214(0)-214(K−1) that are generated by K issue lane circuits 216(0)-216(K−1) in the respective issue lanes $L_0$-$L_{K-1}$. Each issue lane circuit 216(0)-216(K−1) associated with a respective issue lane $L_0$-$L_{K-1}$ is configured to generate a wake-up signal 214(0)-214(K−1) among the K wake-up signals 214(0)-214(K−1) on a wake-up signal port 221 in response to a producer instruction being issued in the respective issue lane $L_0$-$L_{K-1}$. The wake-up signal 214(0)-214(K−1) can include respective source register tags ("register tags") 218(0)-218(K−1) to identify a source register as being issue ready or issue not ready. The register tags 218(0)-218(K−1) may be source physical register tags that identify a physical source register as being issue ready or issue not ready. When a producer instruction is issued in an issue lane $L_0$-$L_{K-1}$ by the scheduler circuit 200, this means that it will be executed by the execution circuit 206 and its produced data stored in a source register resulting from execution available to be consumed by any consumer instruction of the producer instruction.

A content addressable memory (CAM) circuit 210 in the reservation circuit 202 is configured to compare the register tags 218(0)-218(K−1) in received wake-up signals 214(0)-214(K−1) for issued producer instructions up to M instructions in the respective reservation entries 204(0)-204(M−1). The CAM circuit 210 determines if all the source registers according to the named source register operands for a given instruction reserved in an instruction field INST(0)-INST(M−1) are ready such that the instruction is ready to be issued for execution. For example, if an instruction reserved in instruction field INST(0)-INST(M−1) of an instruction reservation entry 204(0)-204(M−1) is a consumer of the issued producer instruction, the issuance of its producer instructions indicated by the register tags 218(0)-218(K−1) in a wake-up signal 214(0)-214(K−1) indicates that the data from the producer instruction will become available, and thus the consumer instruction that consumes such source registers identified by the register tags 218(0)-218(K−1) are ready. The reservation circuit 202 is configured to generate M instruction ready signals indicating if an instruction in a respective reservation entry 204(0)-204(M−1) is ready to be issued based on the comparison of the wake-up signals 214(0)-214(K−1) for issued producer instructions to M instructions in the respective reservation entries 204(0)-204(M−1).

With continuing reference to FIG. 2, the pick circuit 208 includes K pick circuits 222(0)-222(K−1) that are configured to receive M instruction ready signals 220(0)-220(M−1) from the reservation circuit 202 and generate respective K issue lane pick signals 224(0)-224(K−1) to identify respective instructions in the reservation entries 204(0)-204(M−1) that are ready to be issued, indicated by an issue state being issue ready. Providing the M instruction ready signals 220(0)-220(M−1) to the K pick circuits 222(0)-222(K−1) involves multiplexing of signals if K is not equal to M. Conventionally, K<M, because an execution circuit, such as execution circuit 206 in FIG. 2, is conventionally not designed to be able to execute M instructions concurrently, nor would such likely be necessary to achieve the desired performance as M instructions may not be ready to issue every clock cycle. The K issue lane pick signals 224(0)-224(K−1) are provided to K issue arbitration circuits 226(0)-226(K−1) in the reservation circuit 202 and are each coupled to a respective issue lane $L_0$-$L_{K-1}$. The issue arbitration circuits 226(0)-226(K−1) are each coupled to the reservation entries 204(0)-204(M−1) such that the M reservation entries 204(0)-204(M−1) are multiplexed into K issue arbitration circuits 226(0)-226(K−1) if K is not equal to M. The issue arbitration circuits 226(0)-226(K−1) are configured to select an instruction from a reservation entry 204(0)-204(M−1) to be issued in response to the instruction identified in the respective issue lane pick signals 224(0)-224(K−1) having an issue state of issue ready. The issue arbitration circuits 226(0)-226(K−1) are each configured to provide the identified instruction to be issued from the received respective issue lane pick signals 224(0)-224(K−1) to a respective associated issue lane $L_0$-$L_{K-1}$, which is then provided to a respective execution lane $L_0$-$L_{K-1}$ in the execution circuit 206 to be executed.

With reference back to FIG. 2, it may be desired to increase 'M' to provide for more reservation entries in the scheduler circuit 200 as well as a larger 'K' issue width for increased performance. An important part of the wake-up design in the scheduler circuit 200 is that a consumer instruction that is dependent on a single-cycle latency producer instruction can be issued by the scheduler circuit 200 in back-to-back clock cycles with the producer instruction. There are three main components of the wake-up timing path in the scheduler circuit 200 in FIG. 2 that affect a single-cycle wake-up timing path, which are: (1) latency in coupling K wake-up signals 214(0)-214(K−1) from K issue lanes $L_0$-$L_{K-1}$ to the pick circuit 208 as a result of up to K producer instructions being issued in the issue lanes $L_0$-$L_{K-1}$; (2) the scheduling latency of the scheme in which the pick circuit 208 picks up to K instructions to issue from the M entries in the reservation entries 204(0)-204(M−1) in the reservation circuit 202: and (3) the latency in coupling K issue lane pick signals 224(0)-224(K−1) issued by the pick circuit 208 for M entries in the reservation circuit 202 to cause up to K instructions in the M reservation entries 204(0)-204(M−1) to be issued in the K issue lanes $L_0$-$L_{K-1}$.

It may be desired to increase the instruction window size M in the reservation circuit 202. The greater the instruction window size M, the more likely there are K available instructions that are always ready to be issued in the K issue lanes $L_0$-$L_{K-1}$ to maximize the efficiency of the execution circuit 206. However, increasing the instruction window size M in the scheduler circuit 200 in FIG. 2 for increased performance can have an adverse effect on latency of all three (3) components of the wake-up timing path in the scheduler circuit 200. Increasing instruction window size M increases the number of endpoints that the K wake-up signals 214(0)-214(K−1) need to be broadcast to in the pick circuit 208, which can increase capacitive and resistive loading in the wake-up timing path, thus increasing delay. Also, increasing the number of K issue lanes $L_0$-$L_{K-1}$ increases the number of wake-up signals 214(0)-214(K−1) coupled to the pick circuit 208, which also increases the capacitive and resistive loading on the pick circuit 208 and in the wake-up timing path, and thus can increase latency of the pick circuit 208.

FIG. 3 is a diagram of an instruction processing circuit 300 that includes an operand pool clustered scheduler circuit 302 ("scheduler circuit 302") that includes a plurality of operand pool reservation circuits 304(0)-304(2). Each operand pool reservation circuit 304(0)-304(2) is configured to cluster instructions, including producer and consumer instructions, having the same number of source operands that must be ready for its issuance. The instructions set architecture (ISA) supported by a processing that includes the instruction processing circuit 300 in FIG. 3 supports instructions that can have up to two (2) source operands as a non-limiting example. As will be discussed in more detail below, each operand pool reservation circuit 304(0)-304(2) is assigned a number of source operands. The operand pool reservation circuits 304(0)-304(2) are configured to cluster instructions in respective reservation entries having the same number of source operands that must be ready to schedule the instruction to K−1 issue lanes $L_0$-$L_{K-1}$ in respective K−1 issue lane circuits 306(0)-306(K−1) for execution by respective execution circuits 308(0)-308(2) in respective execution lanes $E_0$-$E_{K-1}$. This is opposed to the scheduler circuit 200 in FIG. 2 that includes one reservation circuit 202 for storing all instructions without regard to clustering instructions having the same number of source operands. In the manner, as an example, the overall number of reservation entries in the scheduler circuit 302 can be distributed among the operand pool reservation circuits 304(0)-304(2) to avoid or reduce an increase in the number of scheduling path connections and complexity in each operand pool reservation circuit 304(0)-304(2). This can avoid an increase or reduce scheduling latency in the scheduler circuit 302 for a given overall number of reservation entries. Note that the number of issue lanes $L_0$-$L_2$ and execution lanes $E_0$-$E_2$ do not have to be the same number as the number of operand pool reservation circuits 304(0)-304(2) provided.

For example, the operand pool reservation circuit 304(0) in the scheduler circuit 302 in FIG. 3 is assigned to reserve instructions having zero (0) or no source operands. Instructions reserved in operand pool reservation circuit 304(0) are immediately ready to be issued without the need compare a source operand for the reserved instruction with register tags 310(0)-310(2) in wake-up signals 312(0)-312(2) on a wake-up bus 314 indicating source registers produced by a producer instruction that are thus ready to be consumed by a consumer instruction. Operand pool reservation circuit 304(1) is assigned to reserve instructions having one (1) source operand in this example. Instructions reserved in operand pool reservation circuit 304(1) are ready to be issued once the source operand of the instruction is ready as determined by the register tags 310(0)-310(2) in the wake-up signals 312(0)-312(2) indicating source registers produced by a producer instruction that are ready to be consumed by a consumer instruction. Operand pool reservation circuit 304(2) is assigned to reserve instructions having two (2) source operands in this example. Instructions reserved in operand pool reservation circuit 304(2) are ready to be issued once both source operands of the instruction are ready as determined by the register tags 310(0)-310(2) in the wake-up signals 312(0)-312(2) indicating source registers produced by a producer instruction that are ready to be consumed by a consumer instruction. If the instruction set architecture (ISA) supported by a processor that includes the instruction processing circuit 300 in FIG. 3 supports instructions having more than three (3) source operands being executed in the same clock cycle, additional operand pool reservation circuits that support assignment of such number of operands can also be provided.

Distributing the reservation entries among the respective operand pool reservation circuits 304(0)-304(2) in the scheduler circuit 302 can reduce the number of comparator circuits in the operand pool reservation circuits 304(0)-304(2). As discussed in more detail below, comparator circuits may be included in reservation entries 320(0)-320($P_0$), 330(1)-330($P_1$), 338(0)-338($P_2$) in the respective operand pool reservation circuits 304(0)-304(2) to compare the register tags 310(0)-310(2) in the wake-up signals 312(0)-312(2) to the source operands of the reserved instructions in the respective reservation entries 320(0)-320($P_0$), 330(1)-330($P_1$), 338(0)-338($P_2$) to determine if such instructions are ready to be issued. For example, no comparator circuits are needed in the reservation entries 320(0)-320($P_0$) in operand pool reservation circuit 304(0), because operand pool reservation circuit 304(0) is assigned to reserve instructions that do not have source operands and thus are immediately ready to be issued. Thus, no comparison of a source operand is needed for instructions reserved in operand pool reservation circuits 304(0). As another example, only one (1) comparator circuit may be provided in each of the reservation entries 330(1)-330($P_1$) in operand pool reservation circuit 304(1), because operand pool reservation circuit 304(1) is assigned to reserve instructions that only have one (1) source operand. There is no need to compare two source operands for an instruction reserved in a reservation entry 330(1)-330($P_1$) in operand pool reservation circuit 304(1) with the register tags 310(0)-310(2) in the wake-up signals 312(0)-312(2). For instructions that have two (2) source operands, operand pool reservation circuit 304(2) is provided that can have two comparator circuits per its reservation entries 338(0)-338($P_2$) so that both source operands of such instructions can be compared to register tags 310(0)-310(2) in the wake-up signals 312(0)-312(2) to be issued. The instructions assigned to each of the operand pool reservation circuits 304(0)-304(2) can be issued in single-clock cycle latency if the source operands of its producer instruction(s) are ready to be consumed after the producer instruction(s) is executed.

Thus, by distributing the reservation entries 320(0)-320($P_0$), 330(1)-330($P_1$), 338(0)-338($P_2$) among the respective operand pool reservation circuits 304(0)-304(2) in the scheduler circuit 302, the number of reservation entries 320(0)-320($P_0$), 330(1)-330($P_1$), 338(0)-338($P_2$) that can include two comparator circuits is reduced. This as opposed to all reservation entries in a non-clustered reservation circuit having to be capable of all number of source operand possibilities for a reserved instruction. As shown in FIG. 3, the wake-up bus 314 is not driving the operand pool reservation circuit 304(0) at all. As discussed in more detail below, the wake-up bus 314 is only driving $P_1$+1 comparator circuits in the operand pool reservation circuits 304(1) equal to the number of reservation entries 330(1)-330($P_1$) in the operand pool reservation circuit 304(1). The wake-up bus 314 is driving 2× $P_2$+1 comparator circuits in the operand pool reservation circuit 304(2), equal to the two comparator circuits for each reservation entry 338(1)-338($P_2$) in the operand pool reservation circuit 304(2). Thus, the operand pool reservation circuits 304(0)-304(2) may have a total of (1× ($P_1$+1))+(2× ($P_2$+1)) comparator circuits. If all the reservation entries 320(0)-320($P_0$), 330(0)-330($P_1$), 338(0)-338($P_2$) were provided in a single reservation circuit that is not clustered, such as the scheduler circuit 200 in FIG. 2, the wake-up bus 314 may have to drive 2× (($P_0$+1)+($P_1$+1)+($P_2$+1)) comparator circuits in the operand pool reservation circuit 304(2), equal to the two comparator circuits for each reservation entry 338(1)-338($P_2$) in the operand pool reservation circuit 304(2).

With continuing reference to FIG. 3, the scheduler circuit 302 is configured to receive instructions 316 from the instruction processing circuit 300. For example, the scheduler circuit 302 in FIG. 3 could be provided as the scheduler circuit 106 in the processor 102 in FIG. 1 that fetches instructions 112 to be decoded and executed. The instructions 316 can include producer instructions and consumer instructions that name source operands pointing to source registers storing produced values by execution of the producer instructions. The scheduler circuit 302 is configured to store the received instruction 316 to an operand pool reservation circuit 304(0)-304(2) based on the number of source operands in the instruction 316. In this example, if the instruction 316 has no source operands, the scheduler circuit 302 stores the instruction 316 as an instruction 318(0)-318($P_0$) in an available reservation entry 320(0)-320($P_0$) in the operand pool reservation circuit 304(0) that is assigned to reserve instructions having no source operands. Also, the scheduler circuit 302 can store an instruction 316 as an instruction 318(0)-318($P_0$) in an available reservation entry 320(0)-320($P_0$) in the operand pool reservation circuit 304(0) if it is known that all source operands are already ready, such as immediate source operands. The scheduler circuit 302 can consult the renaming access table circuit 128 as in the processor 102 in FIG. 1 to determine if a received instruction 316 has source operand(s) that is already ready.

A ready indicator 322(0)-322($P_0$) is set to a ready state (e.g., a logical '0' or '1' can indicate a ready state, and the opposite logic state can represent a non-ready state) in the reservation entry 320(0)-320($P_0$) to indicate that the reserved instruction in the reservation entry 320(0)-320($P_0$) is ready to be issued. The operand pool reservation circuit 304(0) is not coupled to the wake-up bus 314, because there is no need to have access to the register tags 310(0)-310(2) to determine if a source register operand of instructions 316 reserved in the operand pool reservation circuit 304(0) are ready to be consumed. Instructions 316 reserved in the operand pool reservation circuit 304(0) are ready to be picked by a pick pool 0 circuit 324(0) to be issued by an issue arbitration circuit 326(0)-326(2) into an issue lane circuit 306(0)-306(2) in a respective issue lane $L_0$-$L_{K-1}$ to be executed by a respective execution circuit 308(0)-308(K−1).

An instruction ready signal 335(0) is generated by the operand pool reservation circuit 304(0) to indicate a respective instruction 318(0)-318($P_0$) is ready to be picked to be issued. In response to the instruction ready signal 335(0), the pick pool 0 circuit 324(0) is configured to pick such instruction 318(0)-318($P_0$) to be issued to the issue arbitration circuits 326(0)-326(2) to be issued to an issue lane $L_0$-$L_{K-1}$. The pick pool 0 circuit 324(0) is configured to issue a lane pick signal 337(0) to the issue arbitration circuits 326(0)-326(2) to identify the respective instruction 318(0)-318($P_0$) ready to be issued.

With continuing reference to FIG. 3, if a received instruction 316 has one (1) source operand that is not ready, the scheduler circuit 302 reserves the instruction 316 in the operand pool reservation circuit 304(1) assigned to reserve instructions having one (1) source operand. The instruction 316 is reserved in as an instruction 328(0)-328($P_1$) in an available reservation entry 330(0)-330($P_1$) in the operand pool reservation circuit 304(1). The scheduler circuit 302 can consult the renaming access table circuit 128 as shown in FIG. 1 to determine if a received instruction 316 has one (1) source operand. Each reservation entry 330(0)-330($P_1$) also includes a source register tag circuit 332(0)-332($P_1$) configured to store a source register tag identifying a source register operand of the reserved instruction 328(0)-328($P_1$) reserved in the corresponding reservation entry 330(0)-330($P_1$). A respective ready indicator 334(0)-334($P_1$) is also in each reservation entry 330(0)-330($P_1$) to store a ready state (e.g., a logical '0' or '1' can indicate a ready state, and the opposite logic state can represent a non-ready state) if the source operand of the reserved instruction 328(0)-328($P_1$) in the reservation entry 320(0)-320($P_1$) is ready, and thus the respective reserved instruction 328(0)-328($P_1$) is ready to be issued. In this example, each of the source register tag circuits 332(0)-332($P_1$) are coupled to the wake-up bus 314 and configured to receive the wake-up signals 312(0)-312(2) that can include register tags 310(0)-310(2) indicating which source registers will be produced by producer instructions issued in the issue lanes $L_0$-$L_{K-1}$. For example, the source register tag circuit 332(0)-332($P_1$) could be content addressable memory (CAM) circuits. If a comparison of the source register indicated in a register tag 310(0)-310(2) in a received wake-up signal 312(0)-312(2) matches the source register tag of a source register tag circuit 332(0)-332($P_1$) in a reservation entry 330(0)-330($P_1$) for a respective reserved instruction 328(0)-328($P_1$), the operand pool reservation circuit 304(1) is configured to set the respective ready indicator 334(0)-334($P_1$) to a ready state to indicate that the source operand of the respective instruction 328(0)-328($P_1$) is ready to be consumed.

An instruction ready signal 335(1) is generated by the operand pool reservation circuit 304(1) to indicate a respective instruction 328(0)-328($P_1$) is ready to be picked to be issued. In response to the instruction ready signal 335(1), a pick pool 1 circuit 324(1) is configured to pick such instruction 328(0)-328($P_1$) to be issued to the issue arbitration circuits 326(0)-326(2) to be issued to an issue lane $L_0$-$L_{K-1}$. The pick pool 1 circuit 324(1) is configured to issue a lane pick signal 337(1) to the issue arbitration circuits 326(0)-326(2) to identify the respective instruction 328(0)-328($P_1$) ready to be issued.

If a comparison of the source register indicated in a register tag 310(0)-310(2) in a received wake-up signal 312(0)-312(2) does not match the source register tag for a source register tag circuit 332(0)-332($P_1$) in a reservation entry 330(0)-330($P_1$) for a respective reserved instruction 328(0)-328($P_1$), the operand pool reservation circuit 304(1) is configured to set or keep set the respective ready indicator 334(0)-334($P_1$) to a non-ready state to indicate that such respective instruction 328(0)-328(Pr) is not ready to be issued. Such instruction 328(0)-328($P_1$) will remain reserved in its respective reservation entry 330(0)-330($P_1$) until ready to be issued.

With continuing reference to FIG. 3, if a received instruction 316 has two (2) source operands that are not ready in this example, the scheduler circuit 302 reserves the instruction 316 in the operand pool reservation circuit 304(2) assigned to reserve instructions having two (2) source operands. The instruction 316 is reserved as an instruction 336(0)-336($P_2$) in an available reservation entry 338(0)-338 ($P_2$) in the operand pool reservation circuit 304(2). Each reservation entry 338(0)-338($P_2$) also includes first and second source register tag circuits 340(0)-340($P_2$), 342(0)-342($P_2$), configured to store respective first and second source register tags identifying first and second source register operands of the reserved instruction 336(0)-336($P_2$) reserved in the corresponding reservation entry 338(0)-338 ($P_2$). Respective ready indicators 344(0)-344($P_2$), 346(0)-346($P_2$) also in each reservation entry 338(0)-338($P_2$) store a ready state (e.g., a logical '0' or '1' can indicate a ready state, and the opposite logic state can represent a non-ready state) if the respective first and second source register operands of the reserved instruction 336(0)-336($P_2$) in the reservation entry 338(0)-338($P_2$) are ready. If both source operands of a reserved instruction 336(0)-336($P_2$) are ready, the respective reserved instruction 336(0)-336($P_2$) is ready to be issued. In this example, each of the source register tag circuits 340(0)-340($P_2$), 342(0)-342($P_2$) are coupled to the wake-up bus 314 and configured to receive the wake-up signals 312(0)-312(2) that can include register tags 310(0)-310(2) indicating which source registers will be produced by producer instructions issued in the issue lanes $L_0$-$L_{K-1}$.

For example, the source register tag circuits 340(0)-340 ($P_2$), 342(0)-342($P_2$) could be CAM circuits. If a comparison of the source register indicated in a register tag 310(0)-310 (2) in a received wake-up signal 312(0)-312(2) matches the source register tag of a source register tag circuit 340(0)-340($P_2$), 342(0)-342($P_2$) in a reservation entry 338(0)-338 ($P_2$) for a respective reserved instruction 336(0)-336($P_2$), the operand pool reservation circuit 304(2) is configured to set the respective ready indicator 344(0)-344($P_2$), 346(0)-346 ($P_2$) to a ready state to indicate that such respective source operand is ready to be consumed. In this regard, a pick pool 2 circuit 324(2) is configured to pick such instruction 336(0)-336($P_2$) to be issued to the issue arbitration circuits 326(0)-326(2) to be issued to an issue lane $L_0$-$L_{K-1}$ once both source operands of the instruction 336(0)-336($P_2$) are ready as indicated by their respective ready indicator 344(0)-344 ($P_2$), 346(0)-346($P_2$) indicating a ready state. An instruction ready signal 335(2) is generated by the operand pool reservation circuit 304(2) to indicate a respective instruction 336(0)-336($P_2$) is ready to be picked to be issued. In response to the instruction ready signal 335(2), the pick pool 2 circuit 324(2) is configured to pick such instruction 336(0)-336($P_2$) to be issued to the issue arbitration circuits 326(0)-326(2) to be issued to an issue lane $L_0$-$L_{K-1}$. The pick pool 2 circuit 324(2) is configured to issue a lane pick signal 337(2) to the issue arbitration circuits 326(0)-326(2) to identify the respective instruction 336(0)-336($P_2$) ready to be issued.

If a comparison of the source register indicated in a register tag 310(0)-310(2) in a received wake-up signal 312(0)-312(2) does not match a first or second source register tag in a respective first or second source register tag circuit 340(0)-340($P_2$), 342(0)-342($P_2$) in an reservation entry 338(0)-338($P_2$) for a respective reserved instruction 336(0)-336($P_2$), the operand pool reservation circuit 304(2) is configured to set or keep set the respective first and second ready indicators 344(0)-344($P_2$) 346(0)-346($P_2$) to a non-ready state to indicate that such respective instruction 336 (0)-336($P_2$) is not ready to be issued. Such instruction 336(0)-336($P_2$) will remain reserved in its respective reservation entry 338(0)-338($P_2$) until ready to be issued.

FIG. 4 is a flowchart illustrating an exemplary process 400 of the scheduler circuit 302 in the instruction processing circuit 300 in FIG. 3 being assigned to an operand pool reservation circuit 304(0)-304(2) assigned to the number of source operands that must be ready for an instruction to be issued, and the picking of such instructions into an issue lane $L_0$-$L_{K-1}$ for execution. The process 400 includes the scheduler circuit 302 receiving a consumer instruction 316 among the plurality of instructions 316 dependent on a producer instruction 316 among the plurality of instructions 316 (block 402 in FIG. 4). The process 400 also includes the scheduler circuit 302 storing the received consumer instruction 316 in a reservation entry 320(0)-320($P_0$), 330(0)-330 ($P_1$), 338(0)-338($P_2$) among a plurality of reservation entries 320(0)-320($P_0$), 330(0)-330($P_1$), 338(0)-338($P_2$) in an operand pool reservation circuit 304(0)-304(2) among at least one operand pool reservation circuit 304(0)-304(2) assigned with the same number of source operands as the number of source operands in the received consumer instruction 316 (block 402 in FIG. 4). The process 400 also includes the scheduler circuit 302 receiving a wake-up signal 312(0)-312 (2) among one or more wake-up signals 312(0)-312(2) each associated with one or more issue lane circuits 306(0)-306 (2), the wake-up signal 312(0)-312(2) comprising at least one register tag 310(0)-310(2) indicating at least one source operand of at least one producer instruction 316 issued to an issue lane circuit 306(0)-306(2) among the one or more issue lane circuits 306(0)-306(2) (block 406 in FIG. 4). The process 400 also includes the scheduler circuit 302 comparing the at least one register tag 310(0)-310(2) to the plurality of reservation entries 320(0)-320($P_0$), 330(0)-330($P_1$), 338 (0)-338($P_2$) in the operand pool reservation circuit 304(0)-304(2) assigned with the same number of source operands as the number of source operands in the received consumer instruction 316 (block 408 in FIG. 4). The process 400 also includes the scheduler circuit 302 issuing an instruction ready signal 335(0)-335(2) for the consumer instruction 316 in the reservation entry 320(0)-320($P_0$), 330(0)-330($P_1$), 338(0)-338($P_2$) to at least one pick pool circuit 324(0)-324 (2) configured to issue the consumer instruction 316 to an issue lane circuit 306(0)-306(K−1) among the one or more issue lane circuits 306(0)-306(K−1) to be executed, in response to at least one source register of a consumer instruction 316 in a reservation entry 320(0)-320($P_0$), 330 (0)-330($P_1$), 338(0)-338($P_2$) among the plurality of reservation entries 320(0)-320($P_0$), 330(0)-330($P_1$), 338(0)-338($P_2$) matching the at least one register tag 310(0)-310(2) (block 410 in FIG. 4).

In the scheduler circuit 302 in FIG. 3, both source register tag circuits 340(0)-340($P_2$), 342(0)-342($P_2$) in the operand pool reservation circuit 304(2) assigned to reserve instructions having two (2) source operands are "live." This means that source register tag circuits 340(0)-340($P_2$), 342(0)-342 ($P_2$) are both coupled to the same wake-up bus 314 such that source register tag circuits 340(0)-340($P_2$), 342(0)-342($P_2$) compare their respective stored source register tags to the register tags 310(0)-310(2) in the wake-up signals 312(0)-312(2) in the same clock cycle as the wake-up signals 312(0)-312(2) as generated. This has the advantage of the scheduler circuit 302 being able to issue a two (2) source operand instruction if both its source operands are ready in the same clock cycle. However, this comes at a cost of each reservation entry 338(0)-338($P_2$) in the operand pool reservation circuit 304(2) having two respective source register tag circuits 340(0)-340($P_2$), 342(0)-342($P_2$) coupled to the wake-up bus 314, thereby adding to the capacitive load on the wake-up bus 314. This can increase wake-up latency when often times, both source operands of a two source operand reserved instruction 336(0)-336($P_2$) in operand pool reservation circuit 304(2) are not ready in the same clock cycle. For example, such source operand reserved instruction 336(0)-336($P_2$) may be dependent on a multi-cycle producer instruction that does not generate source operands in the same clock cycle when executed.

Thus, in an alternative operand pool reservation circuit design, multiple operand pool reservation circuits in the scheduler circuit 302 in FIG. 3, such as operand pool reservation circuit 304(2), could be designed so that only one of the first and second source register tag circuits 340(0)-340($P_2$), 342(0)-342($P_2$) in each reservation entry 338(0)-338($P_2$) is "live," meaning coupled to the wake-up bus 314 to receive non-delayed wake-up signals 312(0)-312(2). For example, if first source register tag circuits 340(0)-340($P_2$) are coupled to the wake-up bus 314, the first source register tag circuits 340(0)-340($P_2$) can receive and perform a comparison of the register tags 310(0)-310(2) in the wake-up signals 312(0)-312(2) to its source register tags in the same clock cycle as the wake-up signals 312(0)-312(2) are generated. Then, if the second source register tag circuits 342(0)-342($P_2$) are coupled to a delayed wake-up bus that delays the wake-up signals 312(0)-312(2) on the wake-up bus 314 by one (1) clock cycle for example, the second source register tag circuits 342(0)-342($P_2$) can receive and perform comparison of the register tags 310(0)-310(2) in the delayed wake-up signals. This has the benefit of reducing the capacitive load of the second source register tag circuits 342(0)-342($P_2$) being coupled to the wake-up bus 314. For example, a delay circuit such as a flip-flop can be coupled to the wake-up bus 314 to generate delayed wake-up signals on a delayed wake-up bus coupled to the second source register tag circuits 342(0)-342($P_2$).

In this regard, FIG. 5 is a diagram of an instruction processing circuit 500 that includes an operand pool clustered scheduler circuits 502 ("scheduler circuit 502") that includes the plurality of operand pool reservation circuits 304(0)-304(2) of the scheduler circuit 302 in FIG. 3. Common elements between the scheduler circuit 302 in FIG. 3 and the scheduler circuit 502 in FIG. 5 are shown with common element numbers and thus will not be re-described herein.

In the scheduler circuit 502 in FIG. 5, an additional operand pool reservation circuit 304(3) is provided that is also assigned to reserve instructions 316 having two (2) source operands. The operand pool reservation circuit 304(3) is similar to the operand pool reservation circuit 304(2), except that as discussed below, one of the source tag register circuits for identifying a source operand for a reserved instruction in the operand pool reservation circuit 304(3) is live for a current clock cycle, while the other source tag register circuit is non-live for the current clock cycle.

With reference to FIG. 5, instructions 316 reserved by the scheduler circuit 502 in the operand pool reservation circuit 304(3) are stored in instructions 504(0)-504($P_3$) in an available reservation entry 506(0)-506($P_3$) in the operand pool reservation circuit 304(3). Each reservation entry 506(0)-506($P_3$) includes first and second source register tag circuits 508(0)-508($P_3$), 510(0)-510($P_3$) each configured to store respective first and second source register tags identifying first and second source register operands of the reserved instruction 504(0)-504($P_3$) reserved in the corresponding reservation entry 506(0)-506($P_3$) like the operand pool reservation circuit 304(2) in FIG. 2. For example, the first and second source register tag circuits 508(0)-508($P_3$), 508(0)-508($P_3$) could be CAM circuits. Respective ready indicators 512(0)-512($P_3$), 514(0)-514($P_3$) also in each reservation entry 506(0)-506($P_3$) store a ready state (e.g., a logical '0' or '1' can indicate a ready state, and the opposite logic state can represent a non-ready state) if the respective first and second source operands of the reserved instruction 504(0)-504($P_3$) in the reservation entry 506(0)-506($P_3$) are ready. If both source operands of a reserved instruction 504(0)-504($P_3$) are ready, the respective reserved instruction 504(0)-504($P_3$) is ready to be issued.

In the operand pool reservation circuit 304(3) in the scheduler circuit 502 in FIG. 5, only the first source register tag circuits 508(0)-508($P_3$) are coupled to the wake-up bus 314 to receive the wake-up signals 312(0)-312(2) in the same clock cycle in which they are generated. Thus, the first source register tag circuits 508(0)-508($P_3$) are deemed "live," meaning that the first source register tag circuits 508(0)-508($P_3$) are capable of comparing the register tags 310(0)-310(2) in the wake-up signals 312(0)-312(2) to the first source register tag in the first source register tag circuits 508(0)-508($P_3$) in the same clock cycle that the wake-up signals 312(0)-312(2) are generated. The second source register tag circuits 510(0)-510($P_3$) are coupled to delayed wake-up signals 312D(0)-312D(2) generated on a delayed wake-up bus 509 by a delay circuit 511, such as a flip-flop as an example. In this example, the delay circuit 511 is configured to delay the wake-up signals 312(0)-312(2) by one (1) clock cycle to generate the delayed wake-up signals 312D(0)-312D(2). Thus, the second source register tag circuits 510(0)-510($P_3$) are deemed "non-live," meaning that the second source register tag circuits 510(0)-510($P_3$) are not capable of comparing the register tags 310(0)-310(2) in the wake-up signals 312(0)-312(2) to the second source register tags in the first source register tag circuits 508(0)-508($P_3$) in the same clock cycle that the wake-up signals 312(0)-312(2) are generated. The second source register tag circuits 510(0)-510($P_3$) can compare the register tags 310(0)-310(2) in the delayed wake-up signals 312D(0)-312D(2) to the second source register tags in the second source register tag circuits 510(0)-510($P_3$) in the following clock cycle in which the wake-up signals 312(0)-312(2) were generated.

Thus, if a comparison of the source register indicated in a register tag 310(0)-310(2) in a received wake-up signal 312(0)-312(2) matches the source register tag in the first source register tag circuits 508(0)-508($P_3$) in a reservation entry 506(0)-506($P_3$) for a respective reserved instruction 504(0)-504($P_3$), the operand pool reservation circuit 304(3) is configured to set the respective ready indicator 512(0)-512($P_3$) to a ready state to indicate that such respective source operand is ready to be consumed. If both source operands of such reserved instruction 504(0)-504($P_3$) are ready according to their ready indicators 512(0)-512($P_3$), 514(0)-514($P_3$) indicating a ready state, a pick pool 3 circuit 324(3) is configured to pick such instruction 504(0)-504($P_3$) to be issued to the issue arbitration circuits 326(0)-326(2) to be issued to an issue lane $L_0$-$L_{K-1}$. An instruction ready signal 335(3) is generated by the operand pool reservation circuit 304(3) to indicate a respective instruction 504(0)-504($P_3$) is ready to be picked to be issued. In response to the instruction ready signal 335(3), the pick pool 3 circuit 324(3) is configured to pick such instruction 504(0)-504($P_3$) to be issued to the issue arbitration circuits 326(0)-326(2) to be issued to an issue lane $L_0$-$L_{K-1}$. The pick pool 3 circuit 324(3) is configured to issue a lane pick signal 337(3) to the issue arbitration circuits 326(0)-326(2) to identify the respective instruction 504(0)-504($P_3$) ready to be issued.

Similarly, if a comparison of the source register indicated in a register tag 310(0)-310(2) in a received delayed wake-up signal 312D(0)-312D(2) matches the source register tag in the second source register tag circuits 510(0)-510($P_3$) in a reservation entry 506(0)-506($P_3$) for a respective reserved instruction 504(0)-504($P_3$), the operand pool reservation circuit 304(3) is configured to set the respective ready indicator 514(0)-514($P_3$) to a ready state to indicate that such respective source operand is ready to be consumed. Again, if both source operands of such reserved instruction 504(0)-504($P_3$) are ready according to their ready indicators 512(0)-512($P_3$), 514(0)-514($P_3$) indicating a ready state, the pick pool 3 circuit 324(3) is configured to pick such instruction 504(0)-504($P_3$) to be issued to the issue arbitration circuits 326(0)-326(2) to be issued to an issue lane $L_0$-$L_{K-1}$. An instruction ready signal 335(3) is generated by the operand pool reservation circuit 304(3) to indicate a respective instruction 504(0)-504($P_3$) is ready to be picked to be issued. In response to the instruction ready signal 335(3), the pick pool 3 circuit 324(3) is configured to pick such instruction 504(0)-504($P_3$) to be issued to the issue arbitration circuits 326(0)-326(2) to be issued to an issue lane $L_0$-$L_{K-1}$. The pick pool 3 circuit 324(3) is configured to issue a lane pick signal 337(3) to the issue arbitration circuits 326(0)-326(2) to identify respective instruction 504(0)-504($P_3$) ready to be issued.

Thus, because the second source register tag circuits 510(0)-510($P_3$) are non-live and coupled to the delayed wake-up signal 312D(0)-312D(2) on the delayed wake-up bus 509, the operand pool reservation circuit 304(3) cannot issue a reserved instruction 504(0)-504($P_3$) in the current clock cycle if both of its source operands become ready according to the register tags 310(0)-310(2) in the same clock cycle. This is because the register tags 310(0)-312(2) will be delayed by a clock cycle from reaching the second source register tag circuits 510(0)-510($P_3$) because of the delay circuit 511 that generates the delayed wake-up signals 312D(0)-312D(2) having the register tags 310(0)-310(2). This can result in a clock cycle penalty for issuing reserved instructions 504(0)-504($P_3$) that have both their source operands ready in the same clock cycle. However, an advantage of the operand pool reservation circuit 304(3) is reduced capacitive loading by the operand pool reservation circuit 304(3) on the wake-up bus 314 which can increase latency of wake-up signals 312(0)-312(2) on the wake-up bus 314 and thus increase of the scheduler circuit 502 in issuing ready instructions. The delay circuit 511 prevents the second source register tag circuits 510(0)-510($P_3$) in the operand pool reservation circuit 304(3) from adding to the capacitive load of the wake-up bus 314.

If both source operands for a reserved instruction 504(0)-504($P_3$) in the operand pool reservation circuit 304(3) are not available in the same clock cycle, there are two possibilities regarding the order that source operands for a reserved instruction 504(0)-504($P_3$) become ready. One possibility is that the first source operand of a reserved instruction 504(0)-504($P_3$) to be ready is in the respective non-live second source register tag circuits 510(0)-510($P_3$). This means that the second source operand of the reserved instruction 504(0)-504($P_3$) that needs to be ready to issue the reserved instructions 504(0)-504($P_3$) will be in the live first source register tag circuits 508(0)-508($P_3$). No issuance clock cycle penalty is realized in this scenario, because the reserved instruction 504(0)-504($P_3$) will be ready to issue in the same clock cycle of the wake-up signals 312(0)-312(2) including the register tag 310(0)-310(2) that matches the second operand for the reserved instruction 504(0)-504($P_3$) in the first source register tag circuits 508(0)-508($P_3$). The first source register tag circuits 508(0)-508($P_3$) do not receive delayed wake-up signals 312D(0)-312D(2), and thus a comparison of the second source operand in the wake-up signals 312(0)-312(2) can be performed in the same clock cycle in which the wake-up signals 312(0)-312(2) are generated in this example.

If both source operands for a reserved instruction 504(0)-504($P_3$) in the operand pool reservation circuit 304(3) are not available in the same clock cycle, there is a second possibility for the order that source operands for a reserved instruction 504(0)-504($P_3$) become ready. The second possibility is that the first source operand of a reserved instruction 504(0)-504($P_3$) to be ready is in the respective live first source register tag circuits 508(0)-508($P_3$). This means that the second source operand of the reserved instruction 504(0)-504($P_3$) that needs to be ready to issue the reserved instructions 504(0)-504($P_3$) will be in the non-live second source register tag circuits 510(0)-510($P_3$). This scenario would result in an additional issuance clock cycle penalty, because if the second source operand of the reserved instruction 504(0)-504($P_3$) becomes ready in a later clock cycle, the second source operand is in the non-live second source register tag circuits 510(0)-510($P_3$). As discussed above, the second source register tag circuits 510(0)-510($P_3$) receive the delayed wake-up signals 312D(0)-312D(2), which are delayed by one clock cycle in this example. Thus, in this scenario, the second source register tag circuits 510(0)-510($P_3$) would always be in a situation of comparing the register tags 310(0)-310(2) in the delayed wake-up signals 312D(0)-312D(2) in a subsequent clock cycle than when the register tags 310(0)-310(2) were generated in the wake-up signals 312(0)-312(2).

To remedy this additional issuance clock cycle penalty in this second scenario when both source operands for a reserved instruction 504(0)-504($P_3$) in the operand pool reservation circuit 304(3) are not available in the same clock cycle, and the first source operand for the reserved instruction 504(0)-504($P_3$) that becomes ready is in the live first source register tag circuits 508(0)-508($P_3$), the operand pool reservation circuit 304(3) can be configured to swap the source register tags and their ready indicators between the first and second source register tag circuits 508(0)-508($P_3$) and 510(0)-510($P_3$). The operand pool reservation circuit 304(3) can be configured in this second scenario to swap the first source register tag and its ready indicator that matches the first source operand for the reserved instruction 504(0)-504($P_3$) to be ready from the live first source register tag circuit 508(0)-508($P_3$) and ready indicator 512(0)-512($P_3$), to the corresponding non-live second source register tag circuit 510(0)-510($P_3$) and ready indicator 514(0)-514($P_3$). Likewise, the source register tag and its ready indicator for the second source operand and its ready indicator for the reserved instruction 504(0)-504($P_3$) in the non-live second source register tag circuit 510(0)-510($P_3$) and ready indicator 512(0)-512($P_3$) is swapped to the corresponding first source register tag circuit 508(0)-508($P_3$) and ready indicator 512(0)-512($P_3$). In this manner, once the second source operand for the reserved instruction 504(0)-504($P_3$) becomes known to be ready through the register tags 310(0)-310(2) in the wake-up signals 312(0)-312(2), the first source register tag circuit 508(0)-508($P_3$) will be able to compare the source register tag for the second operand of the reserved instruction 504(0)-504($P_3$) that needs to be ready for its issuance without delay incurred in the delayed wake-up signals 312D(0)-312D(2).

FIG. 6 is a diagram of an exemplary reservation entry 506 in the operand pool reservation circuit 304(3) in the scheduler circuit 502 in FIG. 5 that is capable of swapping source register tags between first and second source register tag circuits 508 and 510. In this regard, the first source register tag circuit 508 includes a first source register tag field 600 configured to store a first source register tag $SRT_1$. The second source register tag circuit 510 includes a second source register tag field 602 configured to store a second source register tag $SRT_2$ for a reservation instruction 504 in the reservation entry 506 (see FIG. 5). For example, the first and second source register tag $SRT_1$, $SRT_2$ are accessible for the reserved instruction 504 by the scheduler circuit 502 from the renaming access table circuit 128 as shown in FIG. 1.

The first source register tag field 600 is coupled to a second source register tag input 604 of the second source register tag field 602, and the second source register tag field 602 is coupled to a first source register tag input 606 of the first source register tag field 600 in a cross-coupled arrangement. The first source register tag circuit 508 also includes a first comparator circuit 608 coupled to the first source register tag field 600 and the wake-up bus 314. The first comparator circuit 608 is configured to pass the first source register tag $SRT_1$ stored in the first source register tag field 600 to the second source register tag input 604 to be stored in the second source register tag field 602, in response to the first source register tag $SRT_1$ stored in the first source register tag field 600 matching a register tag 310(0)-310(2) in the wake-up signals 312(0)-312(2) on the wake-up bus 314. In this manner, when the first source register tag $SRT_1$ in the first source register tag circuit 508 matches a register tag 310(0)-310(2) in the wake-up signals 312(0)-312(2), the first source register tag $SRT_1$ and the second source register tag $SRT_2$ are swapped between the first and second source register tag fields 600, 602.

In this example of the scheduler circuit 502 in FIG. 5, the operand pool reservation circuit 304(2) in the scheduler circuit 502 is optional, because the operand pool reservation circuit 304(3) is capable of reserving instructions 316 that have two (2) source operands. However, it still may be desirable to include the operand pool reservation circuit 304(2) in the scheduler circuit 502, because of the aforementioned one clock cycle penalty that is incurred in the operand pool reservation circuit 304(3) when both source operands of an instruction 316 become available in the same clock cycle. Because both the first and second source register tag circuits 340(0)-340($P_2$), 342(0)-342($P_2$) are "live," meaning both are coupled to the non-delayed wake-up bus 314 to receive the non-delayed wake-up signals 312(0)-312(2), the operand pool reservation circuit 304(2) is capable of issuing a reserved instruction 336(0)-336($P_2$) that has both of its source operands available in the same clock cycle with a clock cycle penalty. However, providing the operand pool reservation circuit 304(2) provides additional circuitry in the scheduler circuit 502 and additional capacitive loading on the wake-up bus 314. Thus, in one example, the operand pool reservation circuit 304(2) can be provided to have less reservation entries 338(0)-338($P_2$) than the reservation entries 506(0)-506($P_3$) in the third operand pool circuit 304(2), meaning $P_2 < P_3$. Thus, the scheduler circuit 502 in FIG. 5 can be configured with assignment polices to decide where instructions 316 with two (2) named source operands in this example will be assigned between the operand pool reservation circuit 304(2) and the third operand pool reservation circuit 304(3).

In one assignment policy, the scheduler circuit 502 can be configured with a pool assignment policy to determine if both source operands of a received instruction 316 will be ready to be issued in the same clock cycle. If so, the received instruction 316 can be assigned to the operand pool reservation circuit 304(3) to avoid a clock cycle wake-up penalty since the first and second source register tag circuits 508 (0)-508($P_3$), 510(0)-510($P_3$) are both live as discussed above. For example, an instruction 316 that has single clock-cycle latency by being dependent on a producer instruction that can produce the source operands of the instruction 316 in a single clock cycle will have both its source operands available in the same clock cycle. However, if the scheduler circuit 502 determines that both source operands of a received instruction 316 will not be ready to be issued in the same clock cycle, the scheduler circuit 502 can assign the instruction 316 to the operand pool reservation circuit 304(2) and a clock cycle wake-up penalty can still be avoided since only one source operand of the instruction 316 will be ready at a time.

The scheduler circuit 502 could also be configured with a pool assignment policy to assign instructions 316 that only have time-critical loads dependent on a single clock cycle producer instruction to the operand pool reservation circuit 304(3). The scheduler circuit 502 could be configured to assign instructions 316 that only do not have time-critical loads even if dependent on a single clock cycle producer instruction to the operand pool reservation circuit 304(2). Assigning a two source operand instructions to the operand pool reservation circuit 304(2) will not result in a failure, but only a clock cycle wake-up penalty if both source operands become available in the same clock cycle.

In another example, the scheduler circuit 502 could also be configured with a pool assignment policy to assign instructions 316 that are branch instructions dependent on a single clock cycle producer instruction to the operand pool reservation circuit 304(3). It may be desired to issue branch instructions with the shortest wake-up latency since branch instructions may have conditional branches that have to be resolved in execution, where reduced latency has a substantial impact on flushing operations if the conditional branch is mispredicted. The scheduler circuit 502 could be configured to assign instructions 316 that are not branch instructions even if dependent on a single clock cycle producer instruction to the operand pool reservation circuit 304(2). Assigning a two source operand instruction to the operand pool reservation circuit 304(2) will not result in a failure, but only a clock cycle wake-up penalty if both source operands become available in the same clock cycle.

FIG. 7 is a block diagram of an exemplary processor-based system 700 that includes a processor 702 (e.g., a microprocessor) that includes an instruction processing circuit 704 that includes an operand pool scheduler circuit 706 that includes a plurality of operand pool reservation circuits each configured to cluster instructions having the same number of source operands that must be ready for its issuance by respective pick circuits to an issue lane for execution by an execution circuit. For example, the processor 702 in FIG. 7 could be the processor 102 in FIG. 1 that includes the instruction processing circuit 704 including an operand pool scheduler circuit 706. The operand pool scheduler circuit 706 could be any of the operand pool scheduler circuits 302 and 502 in FIGS. 3 and 5, respectively, as non-limiting examples. The processor-based system 700 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 700 includes the processor 702. The processor 702 represents one or more general-purpose processing circuits, such as a microprocessor, central processing unit, or the like. More particularly, the processor 702 may be an EDGE instruction set microprocessor, or other processor implementing an instruction set that supports explicit consumer naming for communicating produced values resulting from execution of producer instructions. The processor 702 is configured to execute processing logic in instructions for performing the operations and steps discussed herein. In this example, the processor 702 includes an instruction cache 708 for temporary, fast access memory storage of instructions accessible by the instruction processing circuit 704. Fetched or prefetched instructions from a memory, such as from a system memory 710 over a system bus 712, are stored in the instruction cache 708. The instruction processing circuit 704 is configured to process instructions fetched into the instruction cache 708 and process the instructions for execution.

The processor 702 and the system memory 710 are coupled to the system bus 712 and can intercouple peripheral devices included in the processor-based system 700. As is well known, the processor 702 communicates with these other devices by exchanging address, control, and data information over the system bus 712. For example, the processor 702 can communicate bus transaction requests to a memory controller 714 in the system memory 710 as an example of a slave device. Although not illustrated in FIG. 7, multiple system buses 712 could be provided, wherein each system bus constitutes a different fabric. In this example, the memory controller 714 is configured to provide memory access requests to a memory array 716 in the system memory 710. The memory array 716 is comprised of an array of storage bit cells for storing data. The system memory 710 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 712. As illustrated in FIG. 7, these devices can include the system memory 710, one or more input device(s) 718, one or more output device(s) 720, a modem 722, and one or more display controllers 724, as examples. The input device(s) 718 can include any type of input device, including but not limited to input keys, switches, voice processors, etc. The output device(s) 720 can include any type of output device, including but not limited to audio, video, other visual indicators, etc. The modem 722 can be any device configured to allow exchange of data to and from a network 726. The network 726 can be any type of network, including but not limited to a wired or wireless network, a private or public network, a local area network (LAN), a wireless local area network (WLAN), a wide area network (WAN), a BLUETOOTH™ network, and the Internet. The modem 722 can be configured to support any type of communications protocol desired. The processor 702 may also be configured to access the display controller(s) 724 over the system bus 712 to control information sent to one or more displays 728. The display(s) 728 can include any type of display, including but not limited to a cathode ray tube (CRT), a liquid crystal display (LCD), a plasma display, etc.

The processor-based system 700 in FIG. 7 may include a set of instructions 730 to be executed by the processor 702 for any application desired according to the instructions. The instructions 730 may be stored in the system memory 710, processor 702, and/or instruction cache 708 as examples of a non-transitory computer-readable medium 732. The instructions 730 may also reside, completely or at least partially, within the system memory 710 and/or within the processor 702 during their execution. The instructions 730 may further be transmitted or received over the network 726 via the modem 722, such that the network 726 includes the computer-readable medium 732.

While the computer-readable medium 732 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A scheduler circuit in a processor configured to receive a plurality of instructions comprising producer instructions and consumer instructions to be scheduled for execution, the scheduler circuit comprising:

at least two (2) operand pool reservation circuits each assigned to store instructions comprising an assigned number of source operands, each operand pool reservation circuit of the at least two (2) operand pool reservation circuits having an assigned number of source operands different from each other operand pool reservation circuit among the at least two (2) operand pool reservation circuits and comprising:

a plurality of reservation entries each configured to store an instruction comprising a number of source operands equal to the assigned number of source operands for the operand pool reservation circuit to be issued for execution; and the scheduler circuit configured to:

receive a consumer instruction among the plurality of instructions dependent on a producer instruction among the plurality of instructions; and store the received consumer instruction in a reservation entry among the plurality of reservation entries in an operand pool reservation circuit among the at least two (2) operand pool reservation circuits assigned with the same number of source operands as a number of non-ready source operands in the received consumer instruction;

each operand pool reservation circuit of the at least two (2) operand pool reservation circuits configured to:

receive a wake-up signal among one or more wake-up signals each associated with one or more issue lane circuits in the processor, the wake-up signal comprising at least one register tag indicating at least one source operand of at least one producer instruction issued to an issue lane circuit among the one or more issue lane circuits;

compare the at least one register tag to the plurality of reservation entries in the operand pool reservation circuit assigned with the same number of source operands as the number of non-ready source operands in the received consumer instruction; and in response to at least one source register of a consumer instruction in a reservation entry among the plurality of reservation entries matching the at least one register tag:
issue an instruction ready signal for the consumer instruction in the reservation entry to at least one pick circuit configured to issue the consumer instruction to an issue lane circuit among the one or more issue lane circuits to be executed.

2. The scheduler circuit of claim 1, wherein:
each reservation entry among the plurality of reservation entries in each of the at least ene two (2) operand pool reservation circuits comprises at least one source register tag circuit configured to store at least one source register tag identifying a source register operand;
the scheduler circuit further configured to:
store at least one source register tag in the at least one source register tag circuit in a reservation entry among the plurality of reservation entries in an operand pool reservation circuit among the at least two (2) operand pool reservation circuits assigned with the same number of source operands as the number of source operands in the received consumer instruction, based on at least one source operand in the received consumer instruction; and
each operand pool reservation circuit of the at least two (2) operand pool reservation circuits configured to:
compare the at least one register tag in at least one wake-up signal to the at least one source register tag in the at least one source register tag circuit in each of the plurality of reservation entries in the operand pool reservation circuit assigned with the same number of source operands as the number of non-ready source operands in the received consumer instruction; and
in response to at least one source register tag in at least one source register tag circuit in a reservation entry among the plurality of reservation entries matching the at least one register tag in the at least one wake-up signal:
issue an instruction ready signal for the consumer instruction in such reservation entry to the at least one pick circuit configured to issue the consumer instruction to an issue lane circuit among the one or more issue lane circuits to be executed.

3. The scheduler circuit of claim 1, further comprising:
a no operand pool reservation circuit assigned to store instructions having no source operands, the no operand pool reservation circuit comprising:
a plurality of reservation entries each configured to store an instruction comprising no source operands to be issued for execution;
the scheduler circuit further configured to:
store a consumer instruction comprising no source operands in a reservation entry among the plurality of reservation entries in the no operand pool reservation circuit; and
the no operand pool reservation circuit configured to:
issue an instruction ready signal for the consumer instruction comprising no source operands to at least one pick circuit configured to issue the consumer instruction comprising no source operands to an issue lane circuit among the one or more issue lane circuits to be executed.

4. The scheduler circuit of claim 1, wherein:
the at least two (2) operand pool reservation circuits comprises:
a first operand pool reservation circuit assigned to store instructions comprising one (1) source operand and comprising:
a plurality of first reservation entries each configured to store an instruction comprising one (1) source operand to be issued for execution; and
a second operand pool reservation circuit assigned to store instructions comprising two (2) source operands and comprising:
a plurality of second reservation entries each configured to store an instruction comprising two (2) source operands to be issued for execution; and
the scheduler circuit configured to:
store the consumer instruction in a reservation entry by being configured to:
store a first consumer instruction among the plurality of instructions comprising one (1) source operand in a first reservation entry among the plurality of first reservation entries in the first operand pool reservation circuit; and
store a second consumer instruction among the plurality of instructions comprising two (2) source operands in a second reservation entry among the plurality of second reservation entries in the second operand pool reservation circuit.

5. The scheduler circuit of claim 4, wherein:
the second operand pool reservation circuit configured to:
compare a first register tag in at least one wake-up signal to the first source register tag in the first source register tag circuit in each of the plurality of second reservation entries in the second operand pool reservation circuit in the received second consumer instruction; and
compare a second register tag in the at least one wake-up signal to the second source register tag in the second source register tag circuit in each of plurality of second reservation entries in the second operand pool reservation circuit in the received second consumer instruction; and
in response to the first source register tag in the first source register tag circuit in the second reservation entry among the plurality of second reservation entries matching the first register tag in the at least one wake-up signal and the second source register tag in the second source register tag circuit in the second reservation entry matching the second register tag in the at least one wake-up signal:
issue an instruction ready signal for the second consumer instruction in such second reservation entry to at least one pick circuit configured to issue the second consumer instruction to an issue lane circuit among the one or more issue lane circuits to be executed.

6. The scheduler circuit of claim 4, further comprising:
a wake-up bus configured to carry at least one wake-up signal; and
a delay circuit coupled to the wake-up bus, the delay circuit configured to delay the at least one wake-up signal to generate at least one clock cycle delayed wake-up signal being delayed at least one clock cycle of a clock signal from the at least one wake-up signal;
each second reservation entry among the plurality of second reservation entries in the second operand pool reservation circuit comprises a first source register tag circuit configured to store a first source register tag identifying a first source register operand and a second source register tag circuit configured to store a second source register tag identifying a second source register operand;

wherein:
the first source register tag circuit for each second reservation entry among the plurality of second reservation entries coupled to the wake-up bus to receive the at least one wake-up signal; and
the second source register tag circuit for each second reservation entry among the plurality of second reservation entries coupled to the delay circuit to receive the at least one clock cycle delayed wake-up signal; and
the second operand pool reservation circuit configured to, in response to the first source register tag in the first source register tag circuit in the second reservation entry among the plurality of second reservation entries matching a first register tag in the at least one wake-up signal and the second source register tag in the second source register tag circuit in the second reservation entry matching a second register tag in the at least one wake-up signal:
issue an instruction ready signal for the second consumer instruction in such second reservation entry to at least one pick circuit configured to issue the consumer instruction to an issue lane circuit among the one or more issue lane circuits to be executed.

7. The scheduler circuit of claim 6, wherein:
the second operand pool reservation circuit further configured to, in response to the first source register tag in the first source register tag circuit in the second reservation entry among the plurality of second reservation entries matching the first register tag in the at least one wake-up signal and the second source register tag in the second source register tag circuit in the second reservation entry not matching the second register tag in the at least one wake-up signal:
store the first source register tag into the second source register tag circuit and store the second source register tag into the first source register tag circuit.

8. The scheduler circuit of claim 7, wherein:
the first source register tag circuit comprises:
a first source register tag field comprising a first source register tag field input, the first source register tag field coupled to a second source register tag field input and configured to store the first source register tag;
a second source register tag field comprising the second source register tag field input, the second source register tag field coupled to the first source register tag field input and configured to store the second source register tag; and
a first comparator circuit coupled to the first source register tag field and the wake-up bus, the first comparator circuit configured to pass the first source register tag stored in the first source register tag field to the second source register tag field input to be stored in the second source register tag field, in response to the first source register tag stored in the first source register tag field matching the at least one register tag in the at least one wake-up signal on the wake-up bus.

9. The scheduler circuit of claim 5, wherein:
the at least two (2) operand pool reservation circuits further comprise:
a third operand pool reservation circuit assigned to store instructions comprising two (2) source operands and comprising:
a plurality of third reservation entries each configured to store an instruction comprising two (2) source operands to be issued for execution; and
each third reservation entry among the plurality of third reservation entries in the third operand pool reservation circuit comprises a third source register tag circuit configured to store a first source register tag identifying a first source register operand, and a fourth source register tag circuit configured to store a second source register tag identifying a second source register operand;
the third operand pool reservation circuit configured to:
compare a first register tag in the at least one wake-up signal to the first source register tag in the third source register tag circuit in each of the plurality of third reservation entries in the third operand pool reservation circuit in the received second consumer instruction; and
compare a second register tag in the at least one wake-up signal to the second source register tag in the fourth source register tag circuit in each of the plurality of third reservation entries in the third operand pool reservation circuit in the received second consumer instruction; and
in response to the third source register tag in the first source register tag circuit in the third reservation entry among the plurality of third reservation entries matching the first register tag in the at least one wake-up signal and the fourth source register tag in the second source register tag circuit in the third reservation entry matching the second register tag in the at least one wake-up signal:
issue an instruction ready signal for the second consumer instruction in such third reservation entry to the at least one pick circuit configured to issue the second consumer instruction to an issue lane circuit among the one or more issue lane circuits to be executed.

10. The scheduler circuit of claim 9, wherein:
the number of third reservation entries in the plurality of third reservation entries in the third operand pool reservation circuit is less than the number of second reservation entries in the plurality of second reservation entries in the second operand pool reservation circuit.

11. The scheduler circuit of claim 9, configured to store the received consumer instruction in the reservation entry in the operand pool reservation circuit among the at least two (2) operand pool reservation circuits by being configured to:
determine if the received consumer instruction comprises two (2) source operands;
in response to determining the received consumer instruction comprises two (2) source operands:
determine if both source operands of the received consumer instruction will be ready to be issued in a same clock cycle; and
in response to determining that both source operands of the received consumer instruction will not be ready to be issued in the same clock cycle:
store the consumer instruction in a second reservation entry in the second operand pool reservation circuit.

12. The scheduler circuit of claim 11, wherein:
in response to determining that both source operands of the received consumer instruction will be ready to be issued in the same clock cycle:
store the consumer instruction in a third reservation entry in the third operand pool reservation circuit.

13. The scheduler circuit of claim 9, configured to store the received consumer instruction in the reservation entry in the operand pool reservation circuit among the at least two (2) operand pool reservation circuits by being configured to:
determine if the received consumer instruction comprises two (2) source operands;
in response to determining the received consumer instruction comprises two (2) source operands:
determine if the received consumer instruction is a single cycle-latency instruction; and
in response to determining the received consumer instruction is a single cycle-latency instruction:
store the consumer instruction in a second reservation entry in the second operand pool reservation circuit.

14. The scheduler circuit of claim 9, configured to store the received consumer instruction in the reservation entry in the operand pool reservation circuit among the at least two (2) operand pool reservation circuits by being configured to:
determine if the received consumer instruction comprises two (2) source operands;
in response to determining the received consumer instruction comprises two (2) source operands:
determine if the received consumer instruction is dependent on a single cycle-latency producer instruction; and
in response to determining the received consumer instruction is dependent on a single cycle-latency producer instruction:
store the consumer instruction in a second reservation entry in the second operand pool reservation circuit.

15. The scheduler circuit of claim 1, wherein:
each reservation entry among the plurality of reservation entries in each of the at least two (2) operand pool reservation circuits is further configured to store at least one source register tag identifying the at least one source operand of a stored instruction; and
each of the at least two (2) operand pool reservation circuits configured to:
compare the at least one register tag to the at least one source register tag in the plurality of reservation entries in the operand pool reservation circuit assigned with the same number of source operands as the number of non-ready source operands in the received consumer instruction; and
in response to at least one source register tag of the consumer instruction in the reservation entry among the plurality of reservation entries matching the at least one register tag, issue the instruction ready signal for the consumer instruction to the at least one pick circuit configured to issue the consumer instruction to the issue lane circuit among the one or more issue lance circuits to be executed.

16. The scheduler circuit of claim 1, further comprising:
the at least one pick circuit configured to pick at least one instruction stored in at least one reservation entry among the plurality of reservation entries in the at least two (2) operand pool reservation circuits into an issue lane circuit among the one or more issue lane circuits to be executed, in response to the instruction ready signal for the consumer instruction indicating the consumer instruction is ready to be issued.

17. The scheduler circuit of claim 1, wherein:
the one or more issue lane circuits comprises a plurality of issue lane circuits; and
further comprising:
a plurality of issue arbitration circuits each coupled to an associated issue lane circuit among the plurality of issue lane circuits and coupled to the at least two (2) operand pool reservation circuits, the plurality of issue arbitration circuits each configured to pass an instruction among the selected consumer instructions to its associated issue lane circuit.

18. The scheduler circuit of claim 17, further comprising:
the plurality of issue lane circuits each configured to generate a wake-up signal among the one or more wake-up signals and comprising an issue state of issue ready, in response to a producer instruction issued in the issue lane circuit.

19. A method of scheduling a plurality of instructions comprising producer instructions and consumer instructions to be executed in an execution circuit in a processor, comprising:
receiving a consumer instruction among the plurality of instructions dependent on a producer instruction among the plurality of instructions;
storing the received consumer instruction in a reservation entry among a plurality of reservation entries in an operand pool reservation circuit among at least two (2) operand pool reservation circuits assigned with a same number of source operands as a number of non-ready source operands in the received consumer instruction, each of the at least two (2) operand pool reservation circuits comprising:
a plurality of reservation entries each configured to store an instruction comprising a number of non-ready source operands equal to the assigned number of source operands different from each other operand pool reservation circuit among the at least two (2) operand pool reservation circuits, to be issued for execution;
receiving a wake-up signal among one or more wake-up signals each associated with one or more issue lane circuits in the processor, the wake-up signal comprising at least one register tag indicating at least one source operand of at least one producer instruction issued to an issue lane circuit among the one or more issue lane circuits;
comparing the at least one register tag to the plurality of reservation entries in the operand pool reservation circuit assigned with the same number of source operands as the number of non-ready source operands in the received consumer instruction; and
issuing an instruction ready signal for the consumer instruction in the reservation entry to at least one pick circuit configured to issue the consumer instruction to an issue lane circuit among the one or more issue lane circuits to be executed, in response to at least one source register of a consumer instruction in a reservation entry among the plurality of reservation entries matching the at least one register tag.

20. The method of claim 19, further comprising:
storing a consumer instruction comprising no source operands in a reservation entry among the plurality of reservation entries in a no operand pool reservation circuit, the no operand pool reservation circuit comprising a plurality of reservation entries each configured to store an instruction comprising no source operands to be issued for execution; and issuing an instruction ready signal for the consumer instruction comprising no source operands to the at least one pick circuit configured to issue the consumer instruction comprising no source operands to an issue lane circuit among the one or more issue lane circuits to be executed.

21. The method of claim 19, wherein storing the received consumer instruction comprises:

storing a first consumer instruction among the plurality of instructions comprising one (1) source operand in a first reservation entry among a plurality of first reservation entries in a first operand pool reservation circuit among the at least two (2) operand pool reservation circuits assigned to store instructions comprising one (1) source operand; and storing a second consumer instruction among the plurality of instructions comprising two (2) source operands in a second reservation entry among a plurality of second reservation entries in a second operand pool reservation circuit among the at least two (2) operand pool reservation circuits assigned to store instructions comprising two (2) source operands.

22. The method of claim 21, further comprising:

comparing a first register tag in at least one wake-up signal to a first source register tag in a first source register tag circuit in each of the plurality of second reservation entries in the second operand pool reservation circuit in the received second consumer instruction;

comparing a second register tag in the at least one wake-up signal to a second source register tag in a second source register tag circuit in each of the plurality of second reservation entries in the second operand pool reservation circuit in the received second consumer instruction; and issuing an instruction ready signal for the second consumer instruction in such second reservation entry to at least one pick circuit configured to issue the second consumer instruction to an issue lane circuit among the one or more issue lane circuits to be executed, in response to the first source register tag in the first source register tag circuit in the second reservation entry among the plurality of second reservation entries matching the first register tag in the at least one wake-up signal, and the second source register tag in the second source register tag circuit in the second reservation entry matching the second register tag in the at least one wake-up signal.

23. The method of claim 21, further comprising:

storing the first source register tag into the second source register tag circuit and storing the second source register tag into the first source register tag circuit, in response to the first source register tag in the first source register tag circuit in the second reservation entry among the plurality of second reservation entries matching the first register tag in the at least one wake-up signal, and the second source register tag in the second source register tag circuit in the second reservation entry not matching the second register tag in the at least one wake-up signal.

24. The method of claim 22, further comprising:

comparing the first register tag in the at least one wake-up signal to a first source register tag in a third source register tag circuit in each of a plurality of third reservation entries each configured to store an instruction having two (2) source operands to be issued for execution, in a third operand pool reservation circuit in the received second consumer instruction, third operand pool reservation circuit assigned to store instructions having two (2) source operands;

comparing the second register tag in the at least one wake-up signal to a second source register tag in a fourth source register tag circuit in each of the plurality of third reservation entries in the third operand pool reservation circuit in the received second consumer instruction; and in response to the third source register tag in the first source register tag circuit in the third reservation entry among the plurality of third reservation entries matching the first register tag in the at least one wake-up signal and the fourth source register tag in the second source register tag circuit in the third reservation entry matching the second register tag in the at least one wake-up signal:

issuing an instruction ready signal for the second consumer instruction in such third reservation entry to the at least one pick circuit configured to issue the second consumer instruction to an issue lane circuit among the one or more issue lane circuits to be executed.

* * * * *